[12] United States Patent
Belashchenko

(10) Patent No.: US 7,670,406 B2
(45) Date of Patent: Mar. 2, 2010

(54) DEPOSITION SYSTEM, METHOD AND MATERIALS FOR COMPOSITE COATINGS

(76) Inventor: Vladimir E. Belashchenko, 9 Irving Dr., Concord, NH (US) 03301

( * ) Notice: Subject to any disclaimer, the term of this patent is extended or adjusted under 35 U.S.C. 154(b) by 453 days.

(21) Appl. No.: 11/686,813

(22) Filed: Mar. 15, 2007

(65) Prior Publication Data

US 2007/0243335 A1 Oct. 18, 2007

Related U.S. Application Data

(63) Continuation of application No. PCT/US2005/033203, filed on Sep. 16, 2005.

(60) Provisional application No. 60/610,472, filed on Sep. 16, 2004.

(51) Int. Cl.
*B22F 1/02* (2006.01)
(52) U.S. Cl. ........................ 75/252; 428/570
(58) Field of Classification Search ........... 75/252; 428/570; 148/403
See application file for complete search history.

(56) References Cited

U.S. PATENT DOCUMENTS

| | | | |
|---|---|---|---|
| 3,856,513 A | | 12/1974 | Chen et al. |
| 4,013,453 A | * | 3/1977 | Patel ............................ 75/252 |
| 4,381,943 A | | 5/1983 | Dickson et al. |
| 4,410,490 A | | 10/1983 | Ray et al. |
| 4,490,329 A | * | 12/1984 | Hare et al. ..................... 419/51 |
| 4,496,635 A | | 1/1985 | Wang et al. |
| 4,523,621 A | * | 6/1985 | Ray ............................... 164/46 |
| 4,606,977 A | | 8/1986 | Dickson et al. |
| 4,692,305 A | | 9/1987 | Rangaswamy et al. |
| 4,725,512 A | | 2/1988 | Scruggs |
| 4,770,701 A | * | 9/1988 | Henderson et al. ............. 75/232 |
| 4,834,815 A | | 5/1989 | Lieberman |
| 5,049,450 A | * | 9/1991 | Dorfman et al. ............. 428/570 |
| 5,055,144 A | | 10/1991 | Fish et al. |
| 5,096,662 A | | 3/1992 | Yamamoto et al. |
| 5,271,965 A | | 12/1993 | Browning |
| 5,643,531 A | | 7/1997 | Kim et al. |
| 5,932,293 A | | 8/1999 | Belashchenko et al. |
| 6,017,490 A | * | 1/2000 | Otsuka et al. .................. 419/35 |
| 6,258,185 B1 | | 7/2001 | Branagan et al. |
| 6,544,597 B2 | | 4/2003 | Takahashi et al. |
| 6,689,234 B2 | | 2/2004 | Branagan |
| 6,780,458 B2 | * | 8/2004 | Seth et al. ..................... 427/201 |
| 6,903,852 B2 | | 6/2005 | Kihaea et al. |
| 7,186,306 B2 | | 3/2007 | Branagan |
| 2001/0019742 A1 | * | 9/2001 | Itsukaichi et al. ............ 427/453 |
| 2004/0120017 A1 | | 6/2004 | Miller |
| 2004/0253381 A1 | | 12/2004 | Branagan |
| 2005/0013723 A1 | | 1/2005 | Branagan |

FOREIGN PATENT DOCUMENTS

| | | |
|---|---|---|
| JP | 63223101 A | 9/1988 |
| JP | 63227734 A | 9/1988 |
| JP | 01159307 | 6/1989 |
| JP | 02060103 | 2/1990 |
| JP | 03140450 | 6/1991 |
| JP | 06077069 | 3/1994 |

OTHER PUBLICATIONS

International Search Report dated Feb. 22, 2006 issued in International Application No. PCT/US05/33203 filed Sep. 16, 2005. 9pgs.

* cited by examiner

*Primary Examiner*—Roy King
*Assistant Examiner*—Ngoclan T Mai
(74) *Attorney, Agent, or Firm*—Grossman, Tucker, Perreault & Pfleger, PLLC

(57) ABSTRACT

A composite powder for a deposition of a composite coating comprises a nonmetallic component and a metallic component, the metallic component having an amorphous structure or a nanocrystalline structure. The metallic component may include an amorphous metallic alloy. The metallic alloy may include constituents having the amorphous structure. The metallic component may include a combination of the metallic alloy existing in the amorphous state and constituents of the amorphous metallic alloy in the amorphous state. The composite metal-ceramic powders are used for depositing composite coatings on a selected surface. Disclosed are several methods and systems for producing such composite powders. Disclosed are also several methods and systems for depositing composite coatings. Advantageously, the deposited coatings exhibit high corrosion resistance, high wear resistance, and excellent structural properties.

13 Claims, 16 Drawing Sheets

TABLE 1

| No. | Cermet Composition | SHS-7170, % content | Oxygen flow rate, SCFH | Kerosene flow rate, gal/h |
|---|---|---|---|---|
| 1 | W-balance; Cr 4%; Co 10%; C 5.3% | 10 | 2000 | 6 |
| 2 | W-balance; Cr 4%; Co 10%; C 5.3% | 15 | 2040 | 5.3 |
| 3-1 | W-balance; Cr 4%; Co 10%; C 5.3% | 50 | 2000 | 6 |
| 3-2 | W-balance; Cr 4%; Co 10%; C 5.3% | 50 | 2050 | 5.3 |
| 4 | Cr$_3$C$_2$-25NiCr | 27 | 2000 | 5.8 |

TABLE 2

| No. | Deposition Efficiency | Microhardness, DPH 300 | Superficial hardness, 15N | Surface roughness Ra, mils |
|---|---|---|---|---|
| 1 | 43 | 1248 | 93 | 126 |
| 2 | 51 | 1200 | 92.5 | 128 |
| 3-1 | 61 | 1146 | 91.2 | 134 |
| 3-2 | 72 | 1041 | 89.6 | 156 |
| 4 | 57 | 977 | 88.8 | 146 |

FIG. 19

TABLE 3

| EXPERIMENTAL SAMPLE | SAMPLE | %1350VM by weight | %SHS 7170 by weight | %SHS 7574 by weight | Blend density (g/cm³) |
|---|---|---|---|---|---|
| 11 | 1350VM | 100 | 0 | 0 | 13.99 |
| 12 | 1-15/85 | 85 | 15 | 0 | 12.42 |
| 13 | 5-15/85 | 85 | 0 | 15 | 12.49 |
| 14 | 5-35/65 | 65 | 0 | 35 | 10.92 |
| 15 | 1-35/65 | 65 | 35 | 0 | 10.8 |
| 16 | 1-50/50 | 50 | 50 | 0 | 9.84 |
| 17 | 5-50/50 | 50 | 0 | 50 | 9.98 |
| 18 | 5-35/65-500 | 65 | 0 | 35(-500) | 10.92 |
| 19 | 5-100 | 0 | 0 | 100 | 7.76 |
| 20 | 1-100 | 0 | 100 | 0 | 7.59 |

TABLE 4

| EXPERIMENTAL SAMPLE | Spray Rate (g/min) | Total No. of Passes | Average Thickness (mils) | Spray rate vs. 1350VM | Cost vs. 1350VM (Alloy=0.6) | DE% |
|---|---|---|---|---|---|---|
| 11 | 68 | 27 | 27 | 1 | 1 | 45 |
| 12 | 72 | 22 | 27.5 | 1.25 | 0.86 | 49 |
| 13 | 67.8 | 24 | 27.1 | 1.13 | 0.83 | 50 |
| 14 | 66.3 | 19 | 28.9 | 1.52 | 0.79 | 57 |
| 15 | 72.2 | 19 | 28 | 1.47 | 0.69 | 56 |
| 16 | 73.4 | 18 | 29.4 | 1.63 | 0.57 | 56 |
| 17 | 73.9 | 18 | 31 | 1.72 | 0.61 | 57 |
| 18 | 71.7 | 20 | 29.4 | 1.47 | 0.79 | 54 |
| 19 | 67.4 | 15 | 33.5 | 2.23 | 0.39 | 59 |
| 20 | 65 | 15 | 34.5 | 2.3 | 0.4 | 62 |

FIG. 20

TABLE 5

| SAMPLE | Microhardness DPH 300 | Superficial Hardness, 15N | Surface Roughness Ra (microinches) | Bond Strength (psi) |
|---|---|---|---|---|
| 1350VM | 1340.4 | 91 | 128 | 12,300 |
| 1-15/85 | 1260.8 | 90 | 161 | >13,500 |
| 5-15/85 | 1232.4 | 92 | 145 | >13,500 |
| 5-35/65 | 1143.3 | 90 | 150 | >13,500 |
| 1-35/65 | 1083.8 | 91 | 171 | >13,500 |
| 1-50/50 | 1052.1 | 90 | 185 | >13,500 |
| 5-50/50 | 1075.4 | 91 | 179 | >13,500 |
| 5-35/65-500 | 1129.7 | 90 | 115 | >13,500 |
| 5-100 | 862.4 | 90 | 197 | >13,500 |
| 1-100 | 907.8 | 90 | 196 | >13,500 |

TABLE 6

| EXPERIMENTAL SAMPLE | 1350VM wt. % | SHS 7170 wt. % | SHS 7574 wt. % | G-65 Mass Loss (g) | G-65 Maximum Scar Depth (in) | Volume lost (mm³) |
|---|---|---|---|---|---|---|
| 11 | 100 | 0 | 0 | 0.0456 | 0.027 | 5.32 |
| 12 | 85 | 15 | 0 | 0.0779 | 0.028 | 6.36 |
| 13 | 85 | 0 | 15 | 0.0647 | 0.023 | 5.25 |
| 14 | 65 | 0 | 35 | 0.0987 | 0.03 | 9.18 |
| 15 | 65 | 35 | 0 | 0.0942 | 0.024 | 8.85 |
| 16 | 50 | 50 | 0 | 0.1204 | 0.036 | 12.42 |
| 17 | 50 | 0 | 50 | 0.1255 | 0.032 | 12.77 |
| 18 | 65(-500) | 0 | 35 | 0.0939 | 0.033 | 8.72 |
| 19 | 0 | 0 | 100 | 0.2394 | 0.087 | 31.36 |
| 20 | 0 | 100 | 0 | 0.2649 | 0.067 | 35.49 |

FIG. 21

TABLE 7

| EXPERIMENTAL SAMPLE | SAMPLE | 1350VM wt. % | SHS 7170 wt. % | SHS 7574 wt. % | Blend Density (g/cm³) | Weight Loss (g) | Volume Loss (mm³) |
|---|---|---|---|---|---|---|---|
| 11 | 1350VM | 100 | 0 | 0 | 13.99 | 0.64 | 45.7 |
| 12 | 1-15/85 | 85 | 15 | 0 | 12.42 | 0.55 | 44.3 |
| 13 | 5-15/85 | 85 | 0 | 15 | 12.48 | 0.47 | 37.6 |
| 14 | 5-35/65 | 65 | 0 | 35 | 10.92 | 0.65 | 59.5 |
| 15 | 1-35/65 | 65 | 35 | 0 | 10.8 | 0.48 | 44.4 |
| 16 | 1-50/50 | 50 | 50 | 0 | 9.84 | 0.54 | 54.8 |
| 17 | 5-50/50 | 50 | 0 | 50 | 9.98 | 0.61 | 61.1 |
| 18 | 5-35/65-500 | 65 | 0 | 35(-500) | 9.982 | 0.57 | 52.2 |
| 19 | 5-100 | 0 | 0 | 100 | 7.76 | 0.62 | 79.8 |
| 20 | 1-100 | 0 | 100 | 0 | 7.59 | 0.62 | 81.7 |

TABLE 8

| EXPERIMENTAL SAMPLE | 1350VM wt. % | SHS 7170 wt. % | SHS 7574 wt. % | Coating Average Thickness (mils) | Deflection (mils) | Comment |
|---|---|---|---|---|---|---|
| 11 | 100 | 0 | 0 | 27.0 | 26-33 | Compressive |
| 12 | 85 | 15 | 0 | 27.5 | 25-40 | Compressive |
| 13 | 85 | 0 | 15 | 27.1 | 28-35 | Compressive |
| 14 | 65 | 0 | 35 | 28.9 | 5-26.5 | Compressive |
| 15 | 65 | 35 | 0 | 28.0 | 11-18.5 | Compressive |
| 16 | 50 | 50 | 0 | 29.4 | (5-8.5) | Neutral-Tensile |
| 17 | 50 | 0 | 50 | 31.0 | 1-12.5 | Neutral |
| 18 | 65 | 0 | 35(-500) | 29.4 | 0-5 | Neutral |
| 19 | 0 | 0 | 100 | 33.5 | (40-43) | Tensile |
| 20 | 0 | 100 | 0 | 34.5 | (50-52) | Tensile |

FIG. 22

DEPOSITION SYSTEM, METHOD AND MATERIALS FOR COMPOSITE COATINGS

This application claims priority to International Application No. PCT/US05/33203 filed on Sep. 16, 2005, which claims priority to U.S. Provisional Application 60/610,472 filed on Sep. 16, 2004, entitled "Deposition System, Method and Materials for Composite Coatings," which is incorporated by reference.

The present invention is directed to composite powders for deposition of high quality composite coatings, and systems and methods for producing such powder.

BACKGROUND

Metal parts of various industrial machines or general-purpose machines are required to have various properties such as impact resistance, corrosion resistance and wear resistance depending upon their respective purposes. However, in many cases, the metal (or substrate) constituting such metal parts cannot adequately satisfy the required properties by itself, and it is therefore often subjected to surface modification, particularly by forming a coating or deposition on the substrate surface.

Varieties of powder compositions for different deposition processes are known and described in publications. Mainly, the powders comprise particles of a nonmetallic/ceramic compound like tungsten carbide, chromium combined with a metal such as Ni, Cr, Co or an alloy containing such a metal as a binder, to form a ceramic/metal composite material. Conventional composite materials based on metallic and nonmetallic compounds are presently made by different manufacturers like Praxair, Sulzer-Metco, etc. A very brief list of some of these compounds is the following: WC-12Co; WC-17Co; WC-10Co-4Cr; $Cr_3C_2$-25NiCr; WC-10Ni. The metallic component of a composite metal-ceramic (cermet) is in a thermodynamically stable state and represented by a metal or an alloy having a crystalline structure.

More complex compositions of cermet powders for surface modification are also well known. Such compositions, comprising nitrides, carbonitrides, borides (for example, titanium carbonitride) and multicomponent metallic alloys (for example, CoCrAlY, FeCrAlY, and so on) have not yet found wide application.

Thermal spray coating typically follows one of several general schemes disclosed in literature and patents. In a first method, particles used to coat a substrate may be heated so that their temperature when they contact the substrate is greater than their melting temperature. This case is generally typical for conventional flame spraying, atmospheric plasma spraying (APS) and low pressure plasma spraying (LPPS). Because the particle is in a melted or fused state and traveling at a relatively high velocity when it contacts the substrate, splashing of the melted or fused particles often occurs during the collision and interaction with the substrate. Melting of the nonmetallic component of a composite powder may cause its undesirable decomposition and phase transformation as well.

As shown in FIG. 12, a normal component of pressure may exist only on a surface area underneath the particle having a diameter $D_x$, which is equal or smaller than diameter D of the sprayed particle. In this case, good bonding may only develop in the area with diameter $D_x$ underneath the particle. The particle will splash, and the portion outside diameter $D_x$, may not make proper contact with the substrate to enable good bonding to it. Splashing often results in voids and excessive surface area of the splashed particles. These characteristics may, consequently, result in excessive oxidation, low wear, corrosion and erosion resistance of the coated object. Higher impact velocities may result in the higher intensity of the impact, splashing, and a greater area of the particle extending outside of diameter $D_x$.

According to a second method, thermal spraying may take place under conditions such that $E_{Tp}+V_p^2/2>E_m$, where $E_{Tp}+V_p^2/2$ is the total energy of the particle upon collision with the substrate; it is the thermal energy of the particle upon contact with the substrate. $E_m$ is the energy needed to heat and melt all the components of the particle (the latent heat of melting is included in $E_m$). $T_p$ is the temperature of the particle upon contact with the substrate. $V_p$ is the velocity of the particle upon contact with the substrate, and $T_m$ is the melting temperature of the particle's nonmetallic component. Such a scheme is often termed "impact fusion" and was disclosed in U.S. Pat. No. 5,271,965, which is incorporated by reference. While the intensity of splashing may be lower than that experienced in the first spraying scheme, splashing of the coating particles is generally experienced during impact fusion. Splashing that occurs during impact fusion results in all of the same consequences discussed above.

According to a third coating method, particles may be heated to a temperature sufficiently low to prevent thermal softening of sprayed particles. The particles heated in this manner may be applied to a substrate at high velocities. This coating scheme may generally only be applicable for use with coating materials having very low yield stress, for example, in a general range of about 200 MPa or less. Amorphous and nanocrystalline alloys considered in the disclosure have significantly higher yield strength which is in the range of about 500-1200 MPa at room temperature. However, this third coating scheme may have a very low efficiency when spraying the metal-ceramic composite powders.

Disadvantages of prior art composite materials are partially related to the metallic compounds or binders, which are based on metals like Ni and Co, and the conventional crystalline alloys with other metals like Cr, etc. In some cases these types of binders do not provide desirable corrosion resistance, bonding with nonmetallic components of a composite material, wear and erosion resistance, toughness and some other properties determining performance of the composite material. Notably, Co and Ni based alloys are expensive. The current deposition processes allow one to deposit the conventional metal-ceramic composites listed above, as well as amorphous and nano- or microcrystalline metallic alloys, more or less successfully.

However, there is still a need for novel metal-ceramic composite coatings and depositions containing amorphous and nanocrystalline metallic components.

SUMMARY OF THE INVENTION

The present invention is directed to composite metal-ceramic powders used for depositing composite coatings on a selected surface. Several embodiments of the present invention are directed to methods and systems for producing such composite powders. Several embodiments of the present invention are also directed to methods and systems for depositing the metal-ceramic composite powders to form coatings. Advantageously, the deposited coatings exhibit high corrosion resistance and excellent structural properties.

According to one important aspect, a composite powder for a deposition of a composite coating comprises a nonmetallic component and a metallic component, the metallic component having an amorphous structure.

Preferably, the metallic component may include an amorphous metallic alloy. The metallic alloy may include constituents having the amorphous structure. The metallic component may include a combination of the metallic alloy existing in the amorphous state and constituents of the amorphous metallic alloy in the amorphous state. The metallic alloy may be in the form of a continuous matrix having the amorphous structure. The metallic component may include a combination of the metallic alloy and an alloy having continuous matrix with an amorphous structure. The metallic alloy may also include constituents having a nanocrystalline structure.

According to another important aspect, a composite powder for a deposition of a composite coating comprises a nonmetallic component and a metallic component, the metallic component having a nanocrystalline structure.

Preferably, the metallic component includes a metallic alloy. The metallic alloy may include some constituents having an amorphous structure.

Preferably, when preparing the composite powders, the ratio of the nonmetallic component and the metallic component may be adjusted for use in thermal spraying deposition, in plasma transfer arc deposition, in laser cladding deposition, or in weld overlay deposition. Preferably, when preparing the composite powders, the ratio of the nonmetallic component and the metallic component may be adjusted to obtain a coating having a selected wear resistance, a selected oxidation resistance, a selected corrosion resistance, a selected toughness, a selected thermal conductivity, or a selected stress property.

Preferably, when preparing the composite powders, the particle size of the nonmetallic component and the metallic component may be adjusted for use in thermal spraying deposition, in plasma transfer arc deposition, in laser cladding deposition, or in weld overlay deposition. Preferably, when preparing the composite powders, the particle size of the nonmetallic component and the metallic component may be adjusted to obtain a coating having a selected wear resistance, a selected oxidation resistance, a selected corrosion resistance, a selected toughness, a selected thermal conductivity, or a selected stress property.

Preferably, when preparing the composite powders, the chemical composition of the nonmetallic component or the metallic component, may be separately, or together, selected to obtain a deposited coating having a selected wear resistance, a selected oxidation resistance, a selected corrosion resistance, a selected toughness, a selected thermal conductivity, or a selected stress property.

According to yet another important aspect, a method of preparing a composite powder for a deposition of a composite coating onto a substrate, comprising: providing a nonmetallic component, providing a metallic component having an amorphous structure (or a nanocrystalline structure), and creating a composite of the nonmetallic component and the metallic component.

According to yet another important aspect, an apparatus for depositing a composite coating includes a deposition gun and a feeder constructed to provide a composite powder comprising a nonmetallic component and a metallic component having an amorphous structure or a nanocrystalline structure.

The apparatus may include a single feeder, or two feeders being constructed to provide separately components of the composite powder, at least some of the components being separately delivered from the powder injectors into the deposition gun.

Optionally, the first of the powder feeding modules may be constructed to provide the nonmetallic component and the second of the powder feeding modules may constructed to provide the metallic component thereby achieving a selected powder mixture inside the apparatus. The metallic component may include an amorphous metallic alloy. The metallic alloy may include constituents having the amorphous structure. The metallic component may include a combination of the metallic alloy existing in the amorphous state and constituents of the amorphous metallic alloy in the amorphous state.

According to a preferred embodiment, the novel composite metal-ceramic powders have an amorphous metallic binder to provide coatings with a combination of low cost, high hardness, high corrosion and oxidation resistance as well as high deposition efficiency. Preferably, the coatings are deposited using the thermal spray process. Additional embodiments of the present invention include thermal spray processes and thermal spray equipment optimized for specific composite metal-ceramic powders for producing the coatings.

Preferably, the novel composite metal-ceramic powders are used for surface modification of various substrates that require high impact resistance, excellent wear resistance, and excellent corrosion and erosion resistance even under high temperature. Preferably, the coatings are deposited using a deposition apparatus which generally provides a stream of gas having a desired temperature and velocity profile. The deposition apparatus includes a feeding module for the introduction of the powder or particulate material into the gas stream and deposition onto the desired surface. Preferably, the deposition apparatus is a high velocity thermal spray (HVTS) apparatus for spraying composite metal-ceramic powders. Alternatively, the deposition apparatus is selected from the high velocity oxygen fuel (HVOF) apparatuses like JP 5000 manufactured by Praxair-Tafa, Diamond Jet manufactured by Sulzer Metco, Jet Kote manufactured by Stellite Coatings, Inc., or the deposition apparatuses described in U.S. Pat. No. 5,932,293. Other deposition apparatuses and methods may be used as well. The technology provides very good cohesion/adhesion between ceramic components and amorphous and/or nanocrystalline metallic components during the deposition process and coating formation.

According to one aspect of the invention, the composite metal-ceramic powder includes at least two (2) components, wherein the first component is a nonmetallic/ceramic component, and the second component is a metallic alloy able to exist at least partially in an amorphous state. The composite metal-ceramic powder may also include a combination of metals, or metallic alloys capable to form an amorphous alloy, and metals or metallic alloys in a microcrystalline (nanocrystalline) state. The nonmetallic/ceramic component is made of at least one compound selected from the group consisting of carbides, borides, nitrides, carbonitrides, oxides, oxycarbonitrides, or any combination of these. The metallic component is at least partially amorphous or has a microcrystalline (nanocrystalline) structure. The metallic component may be chosen from amorphous and nanocrystalline alloys (for example, those disclosed in U.S. Pat. Nos. 6,258,185 and 6,689,234, which are incorporated by reference). The composite powder may also include one or several additional components, for example, an additional crystalline metallic component. The additional metallic component may include Cobalt, Nickel, Chromium and combinations thereof.

In optimal composite powders, the amorphous metal alloy comprises no less than 50% by volume of the total metallic phase of the composite powder. Furthermore, the composite powder may be characterized by the fact that the size of the discrete particles, or that of the discrete agglomerates of particles, of the metallic component is less than 100 µm, more preferably less than 45 µm and most preferably within 15 to 45 µm.

Moreover the novel composite powders may be characterized by the fact that discrete particles of the nonmetallic component are imbedded into the matrix of the metallic component. The composite coating may also contain the amorphous metal alloy that includes a crystalline phase with crystals no larger than 200 nm, or preferably no larger than 100 nm.

The composite powder may have different particle size distribution, which is dictated by deposition method. According to one embodiment, particle size may be in the range of 40 to 160 µm. According to another embodiment, particle size may be in the range of 20 to 106 µm. According to a third embodiment, particle size range may be 15 to 53 µm and 15 to 45 µm. Other ranges of particle size may be produced satisfying requirements for a certain deposition quality and capability of a deposition process.

BRIEF DESCRIPTION OF THE DRAWINGS

FIG. 19 includes Tables 1 and 2, wherein Table 1 shows the compositions of deposited coatings and deposition parameters, and Table 2 provides a summary of the deposition efficiency and the test results of the coatings described in Table 1.

FIG. 20 includes Tables 3 and 4, wherein Table 3 shows the compositions of deposited coatings, and Table 4 provides a summary of the sprayability results of the coatings described in Table 3.

FIG. 21 includes Tables 5 and 6, wherein Table 5 provides a summary of test data performed on the coatings described in Table 3, and Table 6 summarizes the results of the G-65 tests performed on the coatings described in Table 3.

FIG. 22 includes Tables 7 and 8, wherein Table 7 provides a summary of the erosion tests performed on the coatings described in Table 3, and Table 8 provides a summary of the deflection tests performed on the coatings described in Table 3.

DESCRIPTION OF THE OF THE PREFERRED EMBODIMENTS

Figure 1:
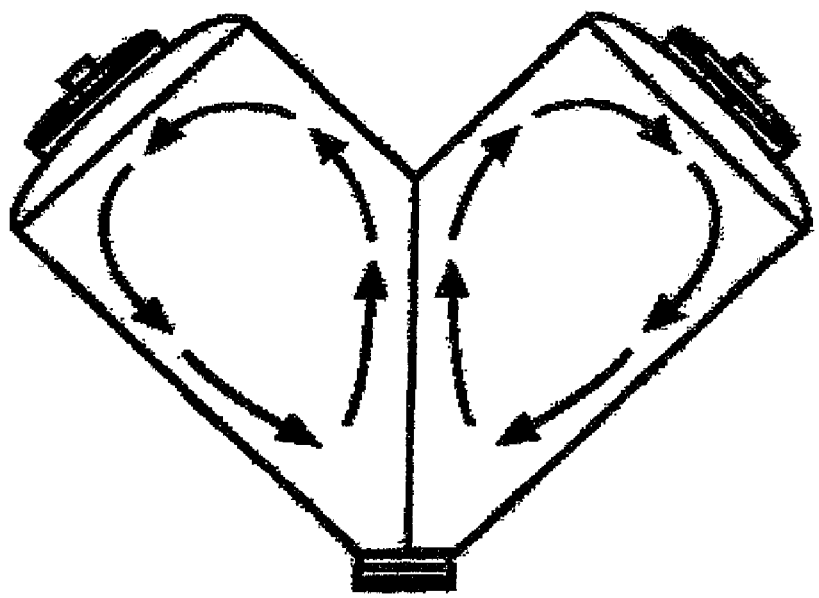
FIG. 1 illustrates a V-shape blender for mixing components to prepare a deposition material.

FIG. 1 illustrates mixing of the powders in a powder mixer such as a V-shaped blender. The V-shape blender is very popular in a wide variety of industries and manufacture, for example, by Gemco. The effective blending is achieved by the constant tolling action of the classic tumble blender. Each leg of the V-shape works independently to efficiently achieve a uniform blend. The precise mixing action results in blend variations of about 1-2%. Each cylindrical leg has an access for easy material loading and cleaning.

After preparation, a cermet powder includes at least two (2) components, wherein the first component is a nonmetallic (hereinafter, the ceramic component), and the second component is a metallic alloy existing or able to exist at least partially in an amorphous state. The second component of the composite metal-ceramic (cermet) powder may also include a combination of metals, or metallic alloys capable to form, at least partially, an amorphous alloy, and metals or metallic alloys in a microcrystalline (nanocrystalline) state with crystals the size of less than 200 nm.

The composite cermet powders are used for deposition of composite coatings. Prior to the deposition (or in some embodiments, during feeding just before the deposition) the cermet powder is manufactured using a variety of processes providing at least one nonmetallic component and at least one metallic component.

The composite thermal spray powder can be prepared by mixing or blending the discrete particles of the nonmetallic component and/or cermet particles with the particles of the metallic component prepared by, for example, gas atomization, the "cast and crush technique," or by a spray-drying and sintering technique, to form amorphous particles or an amorphous metallic alloy. The created particles are discrete particles, discrete agglomerates of particles or a combination thereof.

Figure 2:
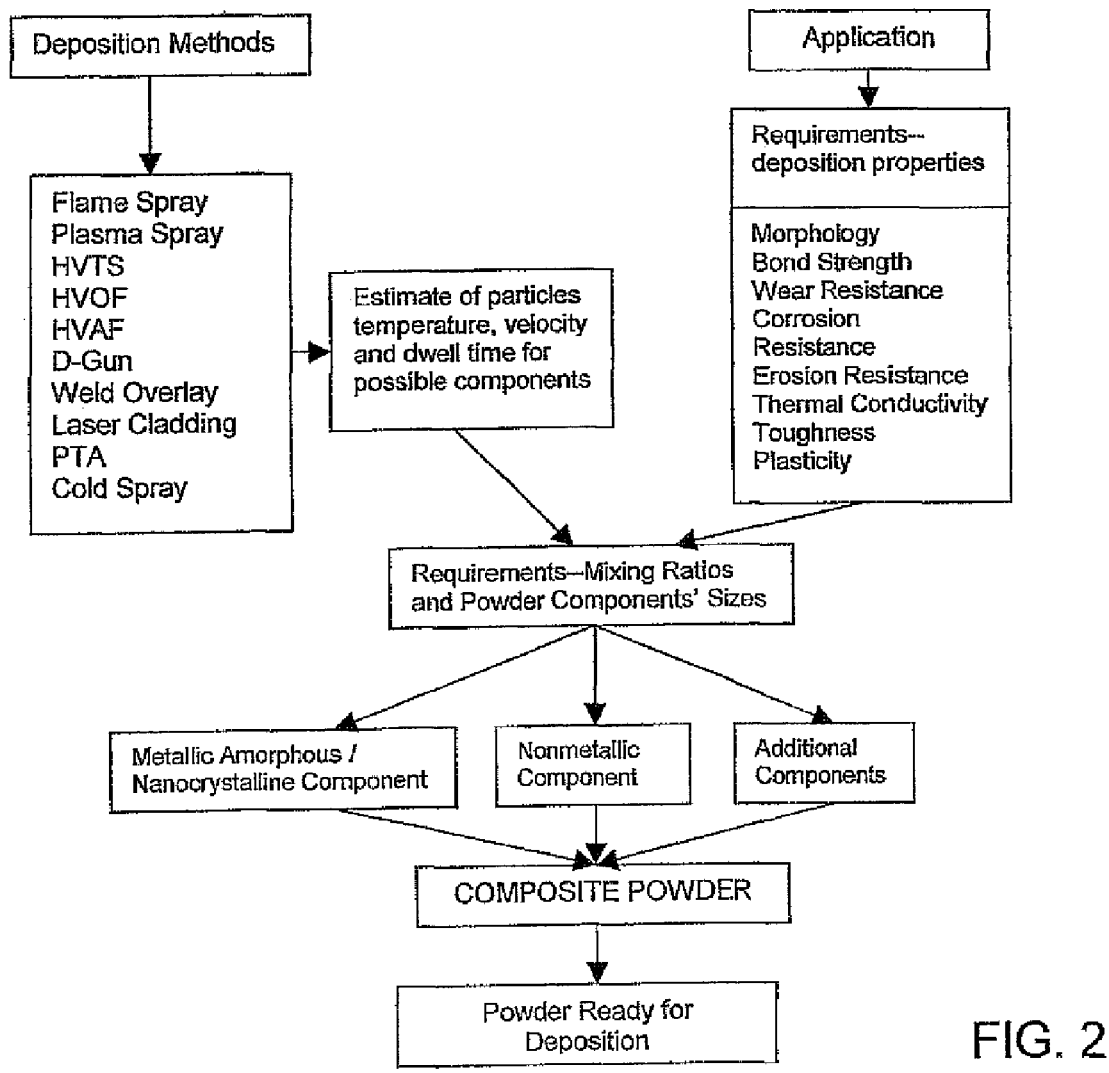
FIG. 2 illustrates different factors taken into account when selecting a ratio of metallic and nonmetallic components of the deposition material.

FIG. 2 illustrates different factors taken into account when selecting a ratio of metallic and nonmetallic components for the composite powder. As described below, a ratio may differ depending on the deposition technique, deposition parameters, and the desired properties of the produced coating. The proper ratio of components can be automatically delivered to a powder-feeding module (e.g., a powder injector) of a spray gun. The components may also be separately delivered to separate powder injectors of a single deposition gun, wherein the proper mixture is achieved by adjusting the feeding rates of each powder injector.

According to one preferred embodiment, the composite thermal spray powder is prepared by a mechanical mixing or blending starting from commercially available nonmetallic powders and a powder of an amorphous metallic alloy. The amorphous metallic alloy is prepared by, for example, gas atomization, water atomization, comminuting of a bulk alloy or similar methods. The composition of the amorphous metallic alloy is selected according to the coating deposition method. Preferably, the content of the nonmetallic component is within the range of 84 to 40% by weight. The composition of the amorphous metallic coating is preferably as described in U.S. Pat. Nos. 6,258,185 and 6,689,234, which are incorporated by reference.

According to another embodiment, the composite thermal spray powder is produced by making a dispersion of particles of the nonmetallic component in a melt of metals capable to form the amorphous metallic alloy upon quenching, following by rapid solidification of the dispersion. The rapid solidification could be performed, for example, by gas atomization or by water atomization or by casting/quenching. Gas atomization results in powders, which should provide desirable size and size distribution of the particles for use in this application. The casting/quenching process results in a bulk material in the form of, for example, ribbons, or stratums, that are to be crushed. Crushed product is to be comminuted by applying, for example, wet or dry ball milling, jet milling, or impact milling. The comminuted product should be then classified according to the application of the resulting thermal spray powder.

The composite powders produced by rapid solidification technique, as described above, are composed of solid (not porous) discrete particles of the amorphous metallic alloy with uniformly dispersed discrete particles of nonmetallic component imbedded in the metallic matrix.

According to yet another embodiment, the composite thermal spray powder is prepared through a spray-drying and sintering technique. In such a technique a dispersion of discrete particles of nonmetallic component and discrete particles of metallic component is first prepared in water or in an organic solvent (e.g., an alcohol) containing an organic binder (e.g., polyvinyl acetate or polyvinyl alcohol). If needed, an inhibitor of corrosion could be added to the dispersion, or slurry, to prevent reaction of the metallic components with water or with the solvent. This slurry is formed into a spherical agglomerated powder by means of a spray drier, for example. Then the spray-dried powder is subjected to classification for the purpose of obtaining a spray-dried powder having a particle size distribution required for the thermal spraying or other deposition conditions for the type of the spraying or deposition apparatus to be used.

To provide appropriate toughness of thus prepared spray-dried and not sintered powders, the content of organic binder in the slurry could be increased up to 5% by weight with respect to the content of solids, if needed. The spray-dried powder could be subjected to thermal treatment (sintering) to remove the organic binder from the agglomerated powder and for the purpose of imparting a proper mechanical strength to the agglomerated powder particles. The sintering temperature should be chosen according to the composition of the metallic component and should be lower than that of the melting point of most refractory metallic constituents of the spray-dried powder. There are no specific limitations on the lowest sintering temperature but appropriate mechanical strength of the sintered particles should be provided. The sintering should be performed in an atmosphere or environment preventing oxidation of the metallic components, such as in a vacuum, in argon, or in hydrogen.

For the successful performance of the spray drying process it is required that the size of the particles of the solids in the slurry should be less than about 10 µm. The metallic components in this process could be in the form of powders of individual metals, powders of partial metal alloys (for example, Ferrochromium, Ferromolybdenum, Ferroniobium, etc.), and/or a combination of these. Powders of individual metals having a particle size of less than 10 µm are commercially available. As for amorphous metallic alloys which are available in the form of ribbons, stratums or atomized powders, they are to be comminuted by applying such techniques as dry/wet ball milling, jet milling, impact milling etc., though cryogenic milling is preferable. By applying cryogenic milling, the amorphous state of the alloy will be preserved in the fine comminuted powder.

According to yet another embodiment, the composite powder is prepared through a sintering and crushing technique. In such a technique, a dry blend of the components is prepared using a known technique and apparatus, such as a ball mill, double cone blender, ribbon blender, etc. The thus prepared blend of components is then loaded into crucibles, sintered and the obtained bulk composite material is then mechanically crushed by means of a known technique such as ball milling, impact milling, etc. Then, the classification is carried out for the purpose of obtaining a composite powder having a particle size distribution required upon the deposition conditions or the type of the deposition apparatus to be used. The sintering temperature and atmosphere should be chosen according to that described for the sintering of spray-dried powders.

The composite powders produced by the spray drying, or the sintering and crushing technique, as described above, are composed of porous (spongy) discrete agglomerates of particles of the amorphous metallic alloy with discrete particles of the nonmetallic component dispersed through the metallic matrix.

The composite powders, manufactured as described above, are deposited to form coatings, for example, as follows.

Figure 3:
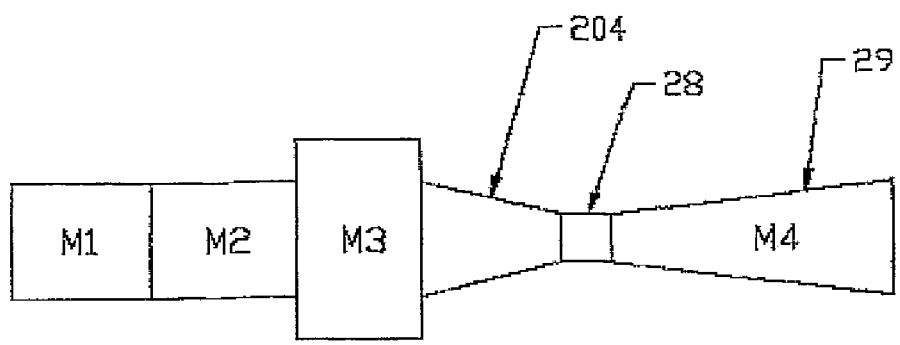
FIG. 3 is a schematic illustration of an embodiment of an HVTS apparatus.

FIG. 3 illustrates a high velocity thermal spray (HVTS) apparatus including a heating module M1 that provides high temperature gases at pressure Pcc. The gas pressure Pcc in the heating module may be about 3-4 times, or more, greater than ambient pressure. The gas at the outlet of the heating module has a temperature Tcc.

The HVTS apparatus may also include a mixing module M2 constructed to combine the high temperature gas generated by the heating module with lower temperature compressed gas. Combining the high temperature gas from the heating module with compressed gas allows the temperature of the gas stream to be controlled and/or adjusted to a desired or predetermined temperature.

The HVTS apparatus may also include a forming module M4, which may form the stream of gases from the mixing module. That is, the forming module may control the pressure and/or velocity profiles of the gases from the mixing module. The forming module preferably accelerates the gases from the mixing module to provide a sonic or supersonic jet of gas.

The HVTS apparatus may also include a powder-feeding module M3, which may feed the powder to be sprayed by the HVTS apparatus into the gas stream produced in the mixing module and/or combustion and mixing modules. The powder introduced in the feeding module may be sprayed onto a substrate to form a coating, to shot peen the substrate or a coating thereon, etc.

The modular design of the HVTS apparatus allows separate modules to be assembled to provide desired performance parameters for the HVTS apparatus as a whole. The separate modules may be assembled, for example, for use with a particular heating module design, spraying materials and/or requirement of coatings to be sprayed. The heating module of the HVTS apparatus may be provided as an oxidizer-fuel combustion module, a plasma torch, or a resistance heater. Other configurations may also be achieved which are consistent with the present disclosure.

In some situations, it may be desirable to operate the heating and mixing modules at a pressure, Pcc, greater than or equal to 5-6 times ambient pressure; in others, Pcc should be greater than or equal to 9-10 times ambient pressure, or greater than or equal to 14-15 times ambient pressure. Such operating pressures Pcc may allow coating particles to be accelerated up to a velocity that may approach, or even exceed, about 1,000 m/s. The exact velocity achieved by the coating particles may vary greatly, however, depending upon the pressure, gas temperature, particle size, etc. Accordingly, the velocity experienced by the coating particles may range from hundreds of meters per second to much greater.

Referring to FIG. 3, an HVTS apparatus 100 includes a heating module M1, a mixing module M2, a forming module M4, and a powder-feeding module M3. While we refer to this apparatus as an HVTS apparatus, the apparatus may be configured as a HVOF (high velocity oxidizer-fuel) apparatus, a high velocity high pressure plasma apparatus, and/or similar systems producing an output including a stream of heated gaseous products. While the HVTS apparatus 100 is schematically delineated as four modules M1, M2, M3, M4, it may include additional features or modules. Additionally, it is not necessary within the present disclosure that the four modules M1, M2, M3, and M4 be physically discrete or separable components. For example, the powder-feeding module M3 may be provided as a part of the forming module M4 or may be disposed within the forming module. Moreover, the various modules M1, M2, M3, and M4 may be disposed in a different arrangement relative to one another. For example, in an embodiment in which the powder-feeding module M3 is not provided as part of, or integrated with, the forming module, the powder-feeding module may be disposed downstream of the forming module M4, rather than upstream of the forming module M4 such as shown in FIG. 3.

The forming module M4 may include a converging zone 204 in which the diameter of the gas passage is reduced. Converging zone 204 may terminate in a throat or orifice 28. From throat 28, the diameter of the gas passage may increase through an expansion zone 29. The increasing diameter of the gas passage in expansion zone 29 may cause the stream of gas to accelerate.

As mentioned above, according to one embodiment herein, the heating module M1 may be capable of operating at pressures (Pcc) that are in the range of about 3-4 times greater than ambient pressure to 15 times ambient pressure or above. The ambient pressure may range from greater than, equal to, or below atmospheric pressure. The gases from the heating module may have a temperature Tcc, measured at the exit of heating module M1.

Figure 4:
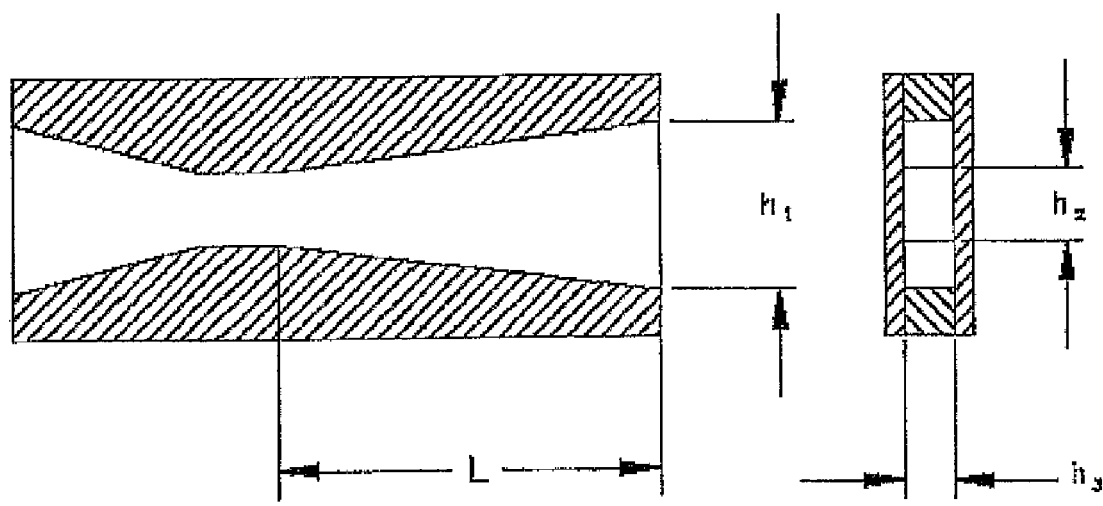
FIG. 4 is an illustration of the rectangular forming block for the HVTS apparatus.

Forming module M4 may have axial symmetry, e.g. it may have a circular cross section and a throat diameter $D_t$ and an expansion zone exit diameter $D_e$. It may, however also be rectangular, as illustrated in FIG. 4.

Heating module M1 may include any variety of apparatuses capable of providing a gas stream having a pressure Pcc and temperature Tcc at the exit of heating module M1. According to various embodiments, heating module M1 may include combustion modules wherein the gas stream may include combustion gases or products. Examples of combustion type heating modules may include oxygen-fuel combustion chambers, such as may be used with conventional high velocity oxygen-fuel thermal spraying apparatuses. Heating module M1 may also include a resistance heating module capable of heating a gas introduced into the module. In other embodiments, heating module M1 may include a plasma module. Heating module M1 may also be a plasma torch, or a combustion device.

Figure 5:
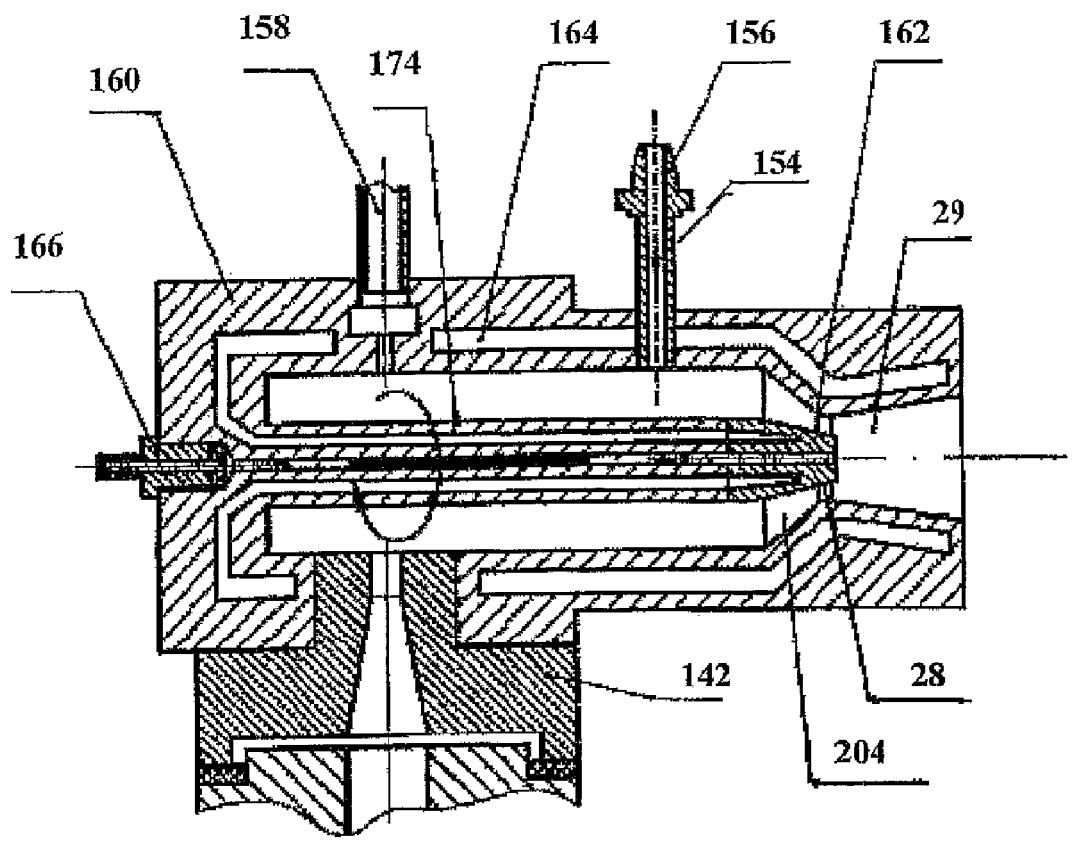
FIG. 5 illustrates an embodiment of the apparatus including a mixing chamber and a forming module with axial powder feeding.
Figure 6:
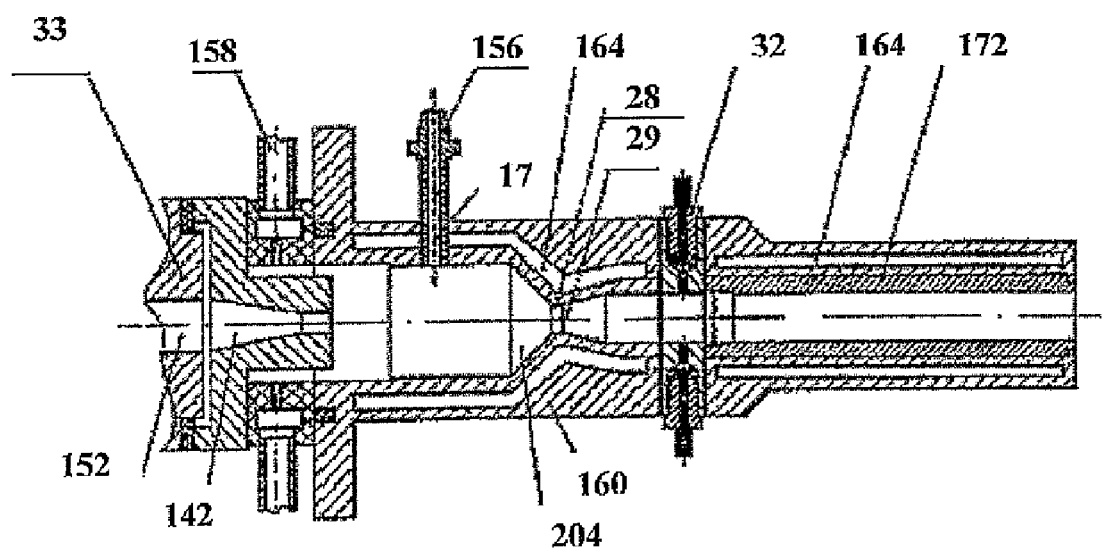
FIG. 6 illustrates an embodiment of a mixing chamber and a forming module with the attached barrel and radial powder feeding in a low pressure zone.
Figure 7:
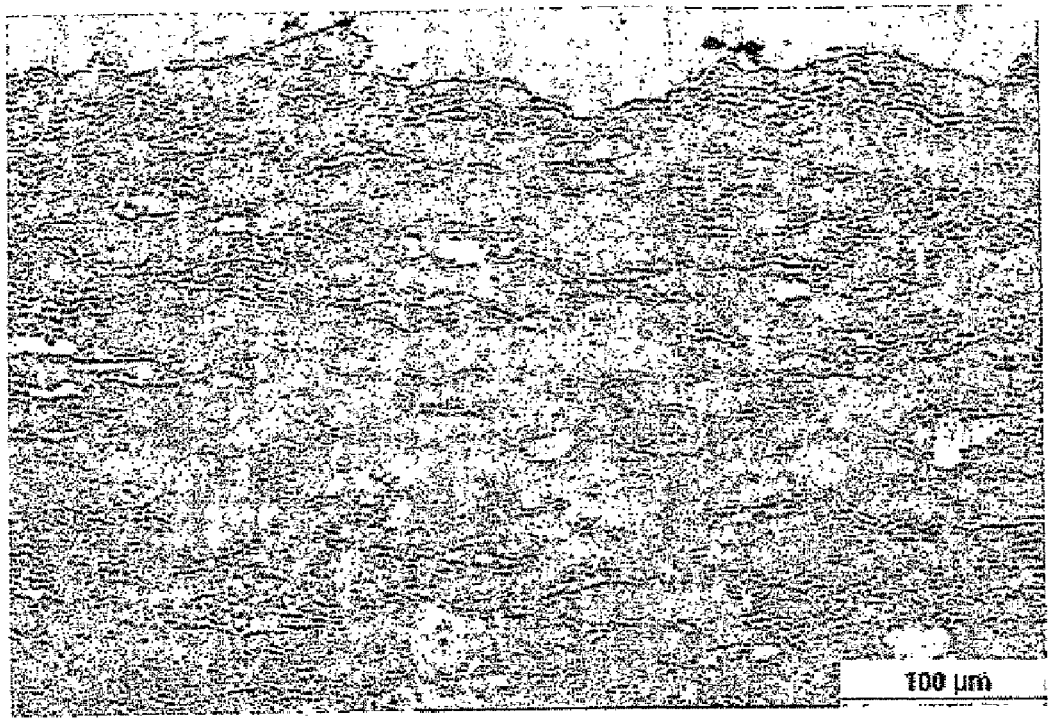
FIG. 7 is an optical micrograph showing a microstructure of a coating sprayed using a blend of WC-10Co-4Cr with 10% SHS 7170 by weight.
Figure 8:
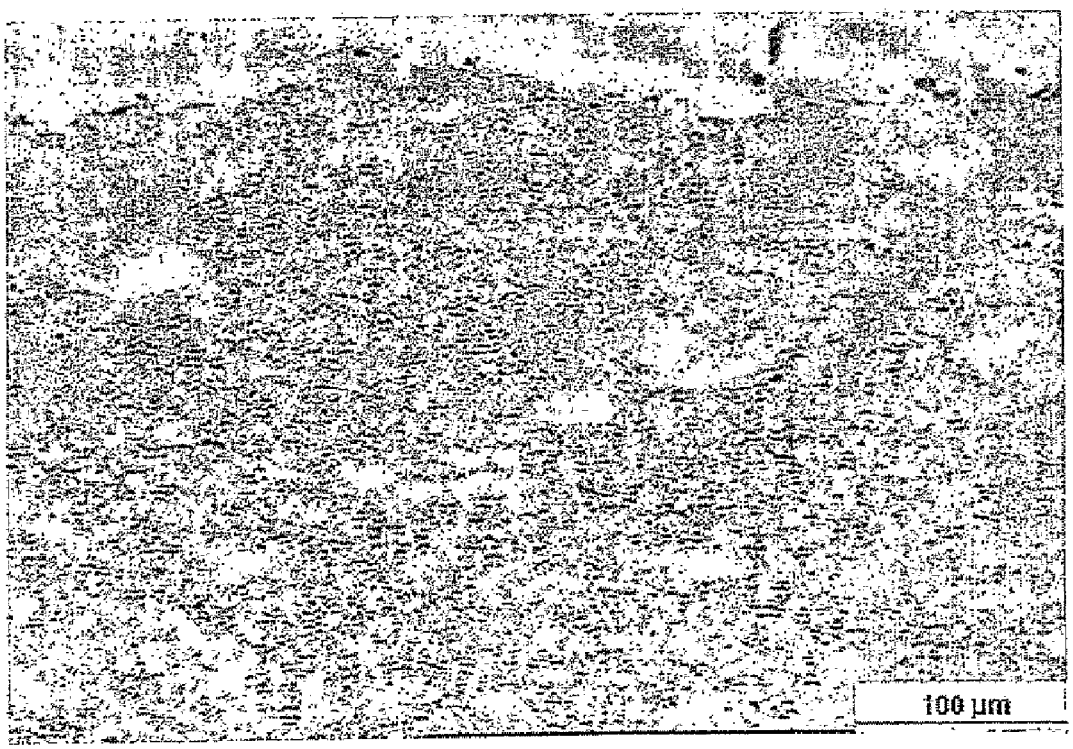
FIG. 8 is an optical micrograph showing a microstructure of a coating sprayed using a blend of WC-10Co-4Cr with 15% SHS 7170 by weight.
Figure 9:
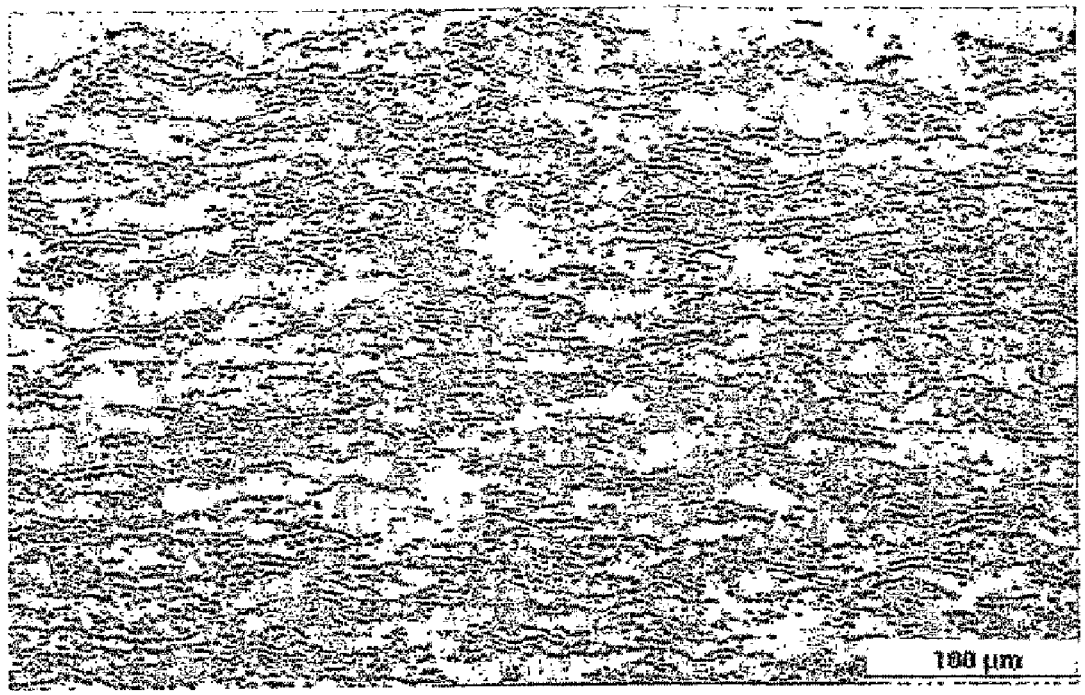
FIG. 9 is an optical micrograph showing a microstructure of a coating sprayed using a blend of WC-10Co-4Cr with 50% SHS 7170 by weight.
Figure 10:
FIG. 10 is an optical micrograph showing a microstructure of a coating sprayed using a blend of $Cr_3C_2$-25NiCr with 27% SHS 7170 by weight.

FIGS. 5 and 6 illustrate an embodiment of an HVTS device including a mixing chamber 160 (M2). The mixing chamber 160 (M2) may be directly or indirectly coupled to the initial plasma-forming module 142 of a plasma torch. Consistent with the illustrated embodiment, mixing chamber 160 (M2) may include one or more passages 158 that may be coupled to a source of pressurized gas at a predetermined temperature. According to one embodiment, the pressurized gas may be at a temperature lower than the temperature of the gas entering mixing chamber 160 (M2) from plasma-forming module 142. The pressurized gas may be, for example, at a temperature much lower than the temperature of the gas entering the mixing chamber 160 from the plasma-forming module 142. Suitable pressurized gases may include Nitrogen, Helium, Argon, air and mixtures thereof, or various other gases. Such gases when released from a pressurized state may naturally achieve a reduced temperature, thereby eliminating the need for any temperature conditioning apparatus. However, the use of temperature conditioning apparatuses, either for cooling or heating the pressurized gas, is contemplated herein.

As shown, mixing chamber 160 (M2) may include at least one passage 154 that may be connected to a pressure sensor (not shown), which may be provided as part of a feedback circuit that may be used to control the pressure in the mixing chamber 160. A plasma jet may exit the plasma channel 152 and may be mixed together with the pressurized gases supplied through passages 158. Mixing of the gases may provide a desired temperature of gases exiting the mixing chamber 160. The mixture of gases may pass from the mixing chamber 160 into a converging zone 204, a throat 28 and an expansion zone 29 of a forming module. The forming module may accelerate the mixture of gases up to a desired velocity. According to one embodiment, the forming module may accelerate the mixture of gases up to a supersonic velocity. The mixing chamber 160 may be water cooled using passages 164.

The embodiment illustrated in FIG. 5 depicts an axial powder feeding system. An axial powder feeding system may advantageously be used in combination with a right angle heating module, i.e., a heating module having a gas outlet oriented at an angle to the outlet of mixing chamber 160. A modified configuration of the axial powder-feeding system may also be used in connection with an embodiment in which the heating module is oriented axially with the outlet of mixing chamber 160. FIG. 5 illustrates the option when mixing chamber 160 is connected with plasma-forming module 142, which is located generally 90 degrees relative to the axis of mixing module 160.

Referring still to FIG. 5, the composite powder or particulate material may be fed through a fitting 166 into a powder channel formed by a powder injector holder 174. Powder injector 162 is connected with the holder 174. Powder injector holder 174, as well as powder injector 162, may be water cooled. The length of the powder injector holder 174 may be adjusted providing a desired position of the powder injector exit within mixing chamber 160 or forming module. The exit of powder injector 162 may be located inside mixing chamber 160, or in the converging zone 204 of the forming module. The exit of the powder injector 162 could also be located in throat 28 of the forming module, or in the expansion zone 29 of the forming module.

FIG. 6 illustrates another embodiment of an HVTS apparatus including the mixing chamber and the forming module and having a radial powder feeding in a low pressure zone. Expansion zone 29 of the forming module may be connected with a barrel that serves to extend the dwell time of particles introduced into the gas stream exiting the forming module. The increase in the dwell time of the particles may also provide an increase in the temperature and velocity of the particles as they exit the barrel. The powder-feeding module (not shown) may be coupled to powder injectors, such as the radial powder injectors 32 of the embodiment shown in FIG. 6. The powder injectors 32 may feed powder into the gas stream from mixing chamber 160 before, during, or after the gas stream has entered the barrel. According to one embodiment, the powder injectors 32 may be located in a low pressure zone of the gas stream. Locating the powder injectors 32 in this manner may allow the use of a low pressure powder-feeding module.

According to another embodiment, the HVTS apparatus may include two or more separate powder-feeding modules (not shown). Each powder-feeding module is coupled to a powder injector, such as the radial powder injectors 32 shown in FIG. 6. Each powder injector provides one component of the composite powder formed inside the low pressure zone. In the present description the term "composite powder" includes powders having two or more components delivered separately into a deposition gun as long as the deposited film includes these components, as described below.

The HVTS apparatus may include numerous other combinations of heating modules, forming modules, barrels, etc., which may be used in the context of the present disclosure.

In general, the novel composite powders are deposited for a coating using any of the well known deposition methods, such as weld overlay, laser cladding, plasma transfer arc (PTA), and thermal spray to deposit coating on different substrates. Suitable thermal spraying methods include (but are not limited to) the processes of atmospheric plasma spray; low pressure plasma spray; high pressure and high velocity plasma spray, flame spray; high pressure and high velocity processes based on combustion of an oxidizer and a fuel; detonation process known as D-gun; and processes known as Cold Spray.

Each particular method may need a specific powder size to efficiently deposit high quality coatings. For example, PTA may need powder with particle sizes within 40 to 160 µm; plasma spraying may need powder with particle sizes within 20 to 106 µm; HVOF may need powder with particle sizes within 15 to 53 µm or within 15 to 45 µm. Moreover, each particular torch delivering deposition for a particular application may need wider or narrower powder size distribution.

According to one embodiment, thermal spraying is used to deposit a coating on a substrate. The method includes feeding a powdered coating material (hereinafter "powder") into a heated stream of gas or plasma. The heated stream of gas or plasma may be used to direct the powder at a substrate to be coated. The heated stream of gas or plasma may heat the particles of powder up to an average particle temperature $T_p$ at the moment of collision with the substrate. Furthermore, the heated stream of gas or plasma may accelerate the particles of powder to an average particle velocity $V_p$ at the moment of collision with the substrate. Upon collision with the substrate, the particles of powder may have a total specific energy $E_p$ expressed by Equation (1)

$$E_p = E_{Tp} + V_p^2/2 < E_m \qquad (1)$$

where $E_{Tp}$ is a specific thermal energy of a particle that collided with the substrate; $E_m$ is the specific energy needed to heat and melt all components of a particle at the temperature $T_m$ (the latent heat of melting of each component of a composite material is included in $E_m$); $T_p$ is the temperature of the particle upon contact with the substrate; $V_p$ is the velocity of the particle upon contact with the substrate; and $T_m$ is the melting temperature of the particle's nonmetallic component.

A result of the condition $E_p < E_m$, expressed by Equation (1), it may be that a nonmetallic component of the particle may not be melted upon colliding with the substrate. Metallic components of a particle may be melted. A metallic component that is melted may result in a minor splashing of the metallic component. Melting of a metallic component may cause some tensile stresses in deposition as well. However, shot peening and densification effect of an unmelted nonmetallic component may minimize the negative effect of splashing and tensile stresses caused by metallic material shrinkage during solidification and cooling. Melted metallic components form thin lamellas and provide continuous anticorrosion protection.

If all components of the particle are not melted upon colliding with the substrate, the particle may not splash as a result of the collision. While the particle may not be melted upon colliding with the substrate, the particle temperature $T_p$ at impact may still be above the brittle-ductile transition temperature of the metallic component of the particle. Allowing $T_p$ to be above the brittle-ductile transition temperature may avoid disintegration of spraying particles as a result of the collision of the particles against the substrate.

A coating may also be sprayed under conditions where small metallic components, for example, below 25 µm, are melted and metallic components of a larger size are not melted but are, however, above the brittle-ductile transition temperature.

During collision, energy may be dissipated and heat transferred into the substrate. This energy dissipation and heat transfer may be characterized as energy loss ΔE. Therefore, total specific particle energy may be estimated according to Equation (2)

$$E_p < E_m + \Delta E = E_{Tp} + V_p^2/2 + \Delta E \qquad (2)$$

Energy loss ΔE may depend on the powder and the substrate material. Accordingly, energy loss ΔE may be determined experimentally in each particular case, i.e., for each given combination of powder and substrate materials.

The composite powder used in the above-described deposition technique includes a blend of amorphous or nanocrystalline metallic particles and nonmetallic particles. Generally, the powder may be manufactured using different approaches providing different morphologies for the resulting powders. The following morphologies of the composite powder are the most effective for the coating deposition:

1. Each powder particle is a homogeneous mixture of amorphous or nanocrystalline metallic particles and nonmetallic particles or their agglomerates. This type of powder may be produced, for example, by spray-drying, or other processes described herein;
2. The composite powder includes a metallic component in the form of a continuous matrix of an amorphous metallic alloy, or an alloy that is capable of existing in an amorphous state, or constituents of this amorphous metallic alloy, or any combination of these in which the discrete particles of nonmetallic component are imbedded in said matrix;
3. The composite powder includes discrete particles of nonmetallic components covered by a film of a metallic component.

The nonmetallic component of the composite powder includes discrete particles, discrete agglomerates of particles containing a metal, or metallic alloy, or any combination thereof. The term "discrete agglomerates of nonmetallic particles contain a metal or a metallic alloy" as used herein is intended to refer to a powder comprising particles having nonmetallic and metallic components, and is considered to be synonymous with such terms as "ceramic/metal composite powder" or "cermet." The composite powder may include a third metallic component.

The term "amorphous metallic alloy" as used herein is intended to refer to metals and alloys that are produced, for example, by rapid solidification process from the liquid state to a substantially amorphous (noncrystalline) solid state, typically having less than 50% crystallinity, which is considered to be synonymous with such terms as "metallic glass" and "glassy metal alloy" or "nanocrystalline alloy" or "microcrystalline alloy." The metallic matrix may be made of crystalline materials like Co, Cr, or Ni alloys, or from amorphous or nanocrystalline metallic alloys. The content of the metallic component should be not less than 6% by weight. At lower content of the metallic component it is hard to expect a continuous metallic matrix in the composite coating, thus the integrity of the coating could be deteriorated.

The nonmetallic particles may have a metallic matrix or may be also embedded into the metallic matrix, which may be understood as a separate third metallic component blended into the powder. The composite powder may contain said nonmetallic compound made from at least one of the compounds selected from the group consisting of carbides, borides, nitrides, carbonitrides, oxides, oxycarbonitrides or any combination of these.

The composite powder is characterized by the discrete particles of nonmetallic component having a size of less than 50 μm, more preferably less than 25 μm, and most preferably within the range of 0.2 to 15 μm. The composite powder may have nonmetallic components in the form of discrete particles, discrete agglomerates of particles or a combination of these, where the discrete agglomerates of nonmetallic particles contain a metal or a metallic alloy in a quantity of 6 to 35% by weight, but no higher than 94% by weight.

The novel composite powders envision a great variety of discrete particles of nonmetallic components which are suitable for making such a composite powder, including, for example, diamond, cubic boron nitride, refractory metal carbides (e.g., tungsten carbides, boron carbide, chromium carbide, silicon carbide), nitrides (for example, titanium nitride), carbonitrides (e.g., titanium carbonitrides, titanium oxycarbonitrides), oxides (e.g., silicon oxide, magnesium oxide, aluminum oxide, stabilized zirconium oxide), pyrolytic carbon, graphite, silica based glasses and natural or synthetic minerals (e.g., silicates). The powders of nonmetallic components having discrete particles of any desirable size are commercially available. The particles selected should, of course, not react with or dissolve in the metal alloy forming the amorphous phase.

It is well known that compounds such as carbon (diamond, graphite), cubic boron nitride, silicon nitride, oxides and so on, possess poor wetting with melted metals/alloys and lack the ability to form strong metallurgical bonds with a metallic matrix. In the practice of this invention, the surface of the nonmetallic component particles may be covered with a thin metal film to promote wetting of nonmetallic particles by a melted metal, and thus provide first, better and more uniform dispersion of nonmetallic particles through the melt, and second, better adhesion of the amorphous metallic component to the surface of the nonmetallic particles in the composite thermal spray powders. Nonmetallic components covered (or cladded) with metallic components may be manufactured by techniques such as physical or chemical vapor deposition, chemical deposition, electrochemical deposition and so on. The film thickness depends on a desirable ratio between metallic and nonmetallic components. Better adhesion results in higher strength/toughness of the particles, which prevents disintegration of the composite powder under spraying or other deposition conditions and thus provides better deposition efficiency and better characteristics of the coatings.

The novel composite powders may utilize prior art powders, such as the amorphous metal-ceramic and microcrystalline metal-ceramic composites disclosed in U.S. Pat. No. 4,770,701, which is incorporated by reference. The metal-ceramic composites are synthesized by solid state reaction-formation methods. These metal-ceramic composites are characterized by a composition that ranges from about 75 to about 99.9 percent ceramic in about 0.1 to about 25 percent amorphous or microcrystalline metal binder phase.

The metal components suitable for the novel composite powder include alloys of Fe, Ni, Co, Cu and combinations thereof, as described in U.S. Pat. No. 4,770,701. This powder component is chosen such that once it is deposited upon the ceramic surface and heat-treatment is initiated, it will readily react with the ceramic material. Therefore, metal-ceramic component pairings should reflect a difference in reactivity properties of the two components sufficient to supply the energy necessary to commence the reaction and drive it to completion. The metal component, which will be precipitated onto the ceramic surface, will be about 10 to about 1,000 Angstroms thick. This component can be chosen to compensate for at least one deficiency of the ceramic material, such as brittleness and/or formation defects. A metal may be added to compensate for brittleness by supplying flexibility and ductility which will allow the composite to absorb expansion and contraction reactions due to rapid temperature change, or to absorb the shock when hit solidly by another hard material.

The composite powders synthesized herein include a thin film of amorphous or microcrystalline metal material disposed on the surface region of larger ceramic particles. This thin film acts as a binder between adjacent ceramic particles. The amount of metal incorporated into the surface region of the ceramic material in the form of amorphous or microcrystalline phase matrix binder must be controlled such that the resultant amorphous or microcrystalline film is distributed uniformly and evenly around the ceramic material surface between adjacent ceramic particles. This insures homogeneity in the resultant composite, and enhances composite stability with respect to both composition and performance. In U.S. Pat. No. 4,770,701 the metal may be contacted with the ceramic material by conventionally known and practiced deposition techniques, including chemical reaction, electrodeposition, electroless deposition, and physical deposition techniques. However, the present teaching eliminates the drawback of the methods disclosed in U.S. Pat. No. 4,770, 701; i.e., the need of at least two technological steps, wherein the first is related to film deposition; the second is related to the further heat treatment providing solid state reaction.

The present disclosure builds on a number of patents related to amorphous, nano- and microcrystalline materials. Specifically, U.S. Pat. No. 3,856,513 is directed to amorphous metallic alloys having the formula M(a)Y(b)Z(c), where M is at least one metal selected from the group of Fe, Ni, Co, Cr and V. Y is at least one element selected from the group consisting of P, B and C. Z is at least one element selected from the group consisting of Al, Sb, Be, Ge, In, Sn and Si. In this formula, (a) ranges from about 60 to 90 atom percent, (b) ranges from about 10 to 30 atom percent and (c) ranges from about 0.1 to 15 atom percent. Furthermore, a variety of compositions of amorphous metallic alloys were described in, for example: U.S. Pat. Nos. 4,381,943; 4,692,305; 5,643,531; 4,496,635; 4,410,490; 5,055,144 and 4,834,815, all of which are incorporated by reference.

The metallic component of the composite powder may also utilize various advanced amorphous and nanocrystalline alloys. For example, the composite powder may utilize the family of amorphous materials named Armacor™, (marketed by Liquidmetals) and disclosed in U.S. Pat. No. 4,725,512 (which is incorporated by reference). Alternatively, the composite powder may utilize the family of amorphous and nanocrystalline Fe-based alloys (Super Hard Steel—SHS) described in U.S. Pat. Nos. 6,258,185B1 and 6,689,234, and in US Patent Applications 2005/0013723, 2004/0253381, 2004/0250929, 2004/0120021, 2004/0120017, all of which are incorporated by reference as if fully reproduced herein. These types of materials may be used in the preparation of the present composite powders.

Some SHS alloys have relatively low thermal conductivity of about 4-14 W/(m*K). Using this low conductivity, amorphous and nanocrystalline components may provide additional thermal barrier benefits to deposited novel composite cermet coatings.

The deposited metal-ceramic composite coatings and the coatings including amorphous and nanocrystalline metallic components provide very good cohesion/adhesion between ceramic components and amorphous and/or nanocrystalline metallic components during the deposition process and coating formation.

The term "amorphous metallic alloy" as used herein is intended to refer to metals and alloys that are rapidly quenched from the liquid state to a substantially amorphous (noncrystalline) solid state, typically having less than 50% crystallinity, which is considered to be synonymous with such terms as "metallic glass" and "glassy metal alloy" or "nanocrystalline alloy" or "microcrystalline alloy." However, the metallic matrix may be made of crystalline materials like Co, Cr, or Ni alloys, or from amorphous or nanocrystalline metallic alloys. The content of the metallic component should be no less than 6% by weight. At lower content of the metallic component it is hard to expect a continuous metallic matrix in the composite coating, thus the integrity of the coating could be deteriorated.

The amorphous metal alloy also comprises no less than 50% by volume of the total metallic component of the composite powder. In another aspect, the composite powder may be characterized by the fact that the size of the discrete particles or that of the discrete agglomerates of particles of a metallic component is less than 100 µm, more preferably less than 45 µm and most preferably within 15 to 45 µm. The composite coating may also contain the amorphous metal alloy that includes a crystalline phase with crystals no larger than 200 nm, or no larger than 100 nm.

Furthermore, the novel composite powders may include discrete particles of the nonmetallic component imbedded into the matrix of the metallic component. The composite coating may also contain the amorphous metal alloy. Since amorphous metallic alloys exist in a metastable state, they begin to crystallize, forming a variety of crystalline phases when heated to a certain and sufficiently high temperature. This process is called devitrification. At the intermediate stage in the devitrification process, the material consists of an amorphous matrix containing a number of crystalline particles having the size of tens or hundreds of nanometers. The diffraction pattern thereby begins to change from that observed for amorphous materials to that observed for crystalline materials. Amorphous metallic alloys have a substantial lack of any long-range atomic order and are characterized by X-ray diffraction patterns consisting of diffuse (broad) intensity maxima. The crystallized amorphous material could be returned to an amorphous state by heating to a temperature close to the melting point. For some of the compositions, crystallized amorphous materials could regain the amorphous state under mechanical stresses caused by applying impact, share or compression load. Examples of these are materials comprising 18-42% by weight of Cr, 1-3.2% by weight of Mn, 3-4.5% by weight of B, 1-3% by weight of Si, or less than 0.3% by weight of C and Fe, are described in U.S. Pat. No. 5,643,531, which is incorporated by reference.

The composite coatings including SHS alloys, as an amorphous and/or nanocrystalline component, is another example of a possible phase transformation in novel cermet depositions. SHS forming a metallic glass during deposition may be devitrified or converted by heat treatment to a partially crystalline material having a nanocrystalline grain size and higher hardness in comparison with the metallic glass. Using these type of alloys as amorphous and nanocrystalline components of the novel cermet powders and further heat treatment of deposited coatings, for example by an annealing or laser beam treatment, may result in a drastic increase of hardness, wear and erosion resistance of the novel cermet coatings. Heat treatment may be performed within 600-800° C. for 8-15 minutes, for example, when annealing is applied. The optimum temperature and time of heat treatment depends on the composition of a material. For SHS 7170, for example, optimum temperature and time may be within 680-720° C. and 9-11 minutes correspondingly.

The composite powder may have different particle size distribution, which is dictated by the deposition method used. In one embodiment, the particle size may be in the range of 40 to 160 µm. In other situations, particle size may be in the range of 20-106 µm, 15 to 53 µm or 15 to 45 µm. Other particle size ranges may be produced, satisfying requirements for deposition quality and potential to use a particular deposition process.

Regarding the powder components, cermets used in the experiments are manufactured by Praxair Surface Technologies and their compositions are listed in Table 1 below. SHS 7170 is manufactured by The NanoSteel Company and in accordance with the accompanying Material Safety Data Sheet (MSDS) has the following composition: Iron-balance, 25% or less Chromium; 8% or less Molybdenum; 10% or less Tungsten, 2% or less Carbon, 5% or less Manganese; 2% or less Silicon; and 5% or less Boron. Cermet and SHS 7170 powder size was within 15-45 μm.

The coatings were sprayed with an HVOF torch JP-5000 manufactured by Praxair-Tafa. All experiments were done using a 4" long barrel, 14" spray distance and approximately 70 gram/min powder-feeding rate. The compositions of the spray blended powders, parameters of spraying, as well as coating properties are presented in Tables 1 and 2.

FIGS. 7-10 are optical micrographs of the composite coatings deposited using a mechanical blend of amorphous alloy powder SHS 7170 with different cermets in accordance with the present disclosure. All optical micrographs show a cross sectional view of coatings deposited on a steel substrate. The present micrographs confirm very good quality of the deposited coating even before optimization of the component ratios. The coatings are relatively dense exhibiting substantially no cracks or other defects, and exhibiting a perfect interface between the particles.

Figure 11:
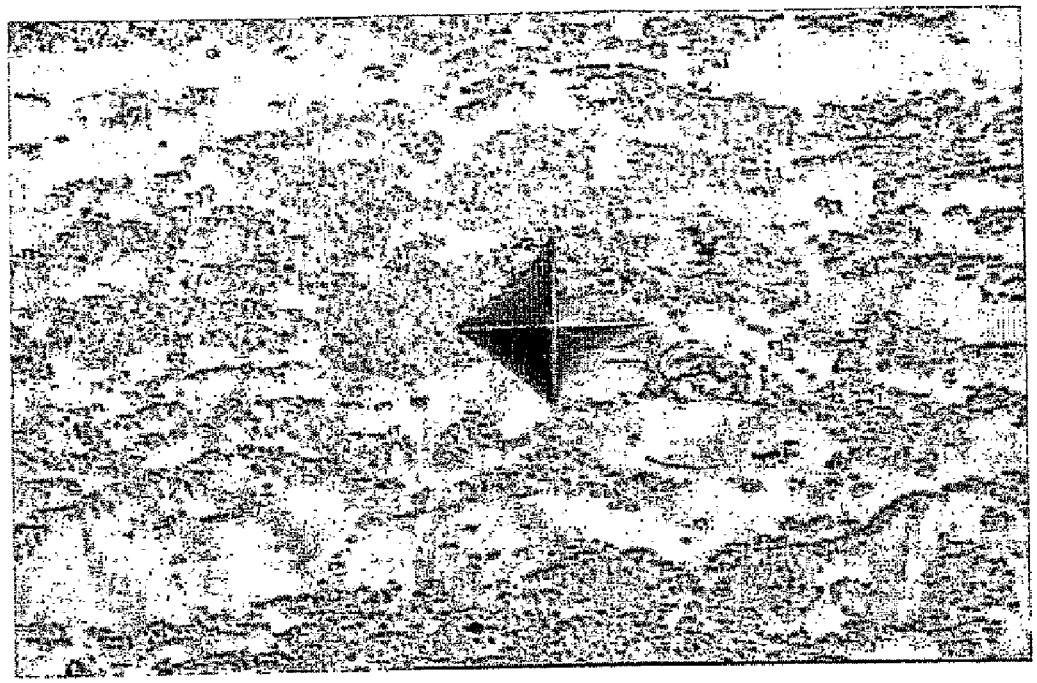
FIG. 11 is an optical micrograph of a sprayed coating showing an indentation at the contact of the WC-10Co-4Cr and SHS 7170 particles for the purpose of the DPH300 measurement.
Figure 12:
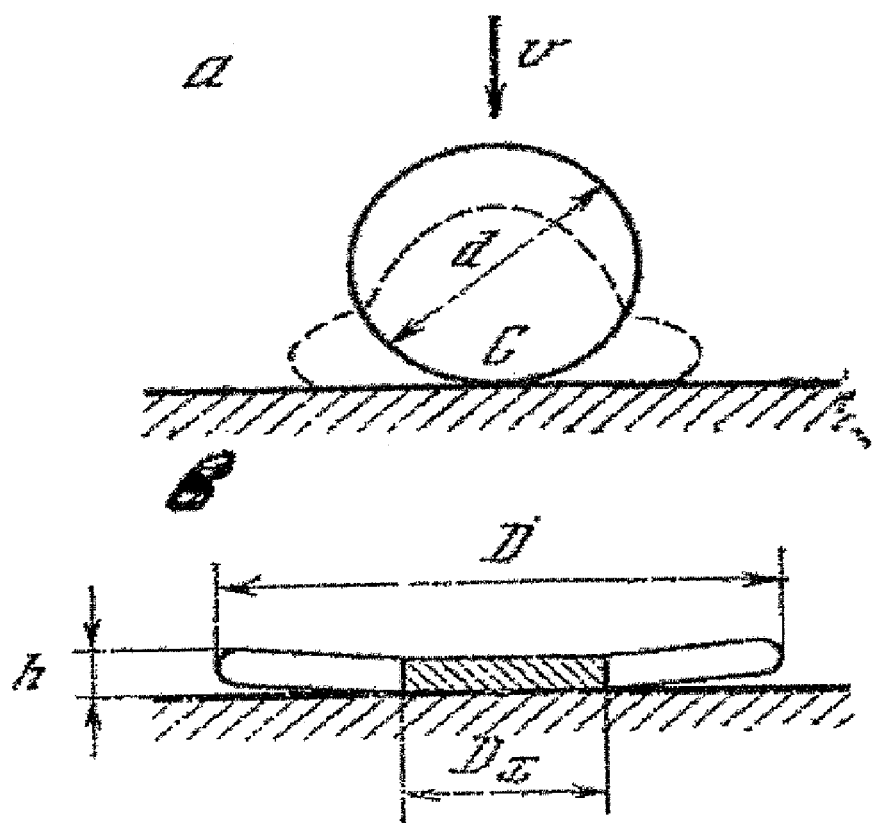
FIG. 12 is a schematic illustration of a melted particle interaction with a substrate at deposition.

Referring to FIG. 11, the coating microstructure shows extremely good bonding between metallic and cermet particles. FIG. 11 shows an indentation area made during a Vickers microhardness (DPH 300) measurement. This indentation did not cause any cracks or defects due to symmetrical indentation and thus confirms the high quality of the coating, which is dense, shows a high quality interface between particles, and great cohesion.

The data related to the coating properties shows that even 50% SHS 7170 still allows getting a very dense coating with extremely good micro- and superficial hardness, which may demonstrate good wear and erosion resistance. At the same time high amounts of SHS 7170 binder may result in a significant increase in corrosion and oxidation resistance.

In general, increases in the amount of SHS 7170 decrease the micro-hardness and the superficial hardness and increase the coating toughness. The component ratio is selected prior to coating deposition to create a coating with selected properties, as shown in FIG. 2.

FIGS. 13A-14B are optical micrographs of different composite coatings oxidized in air for 5 hours at 750° C. and 850° C. All micrographs show high quality coatings. High oxidation resistance was confirmed by oxidation tests in air performed for 5 hours at 750° C. and 850° C. Coatings #1 and #3-1 were tested simultaneously with coating W-balance; Cr 4%; Co 10%; C 5.3% commercially available and manufactured, for example, by Praxair.

Figure 13A:
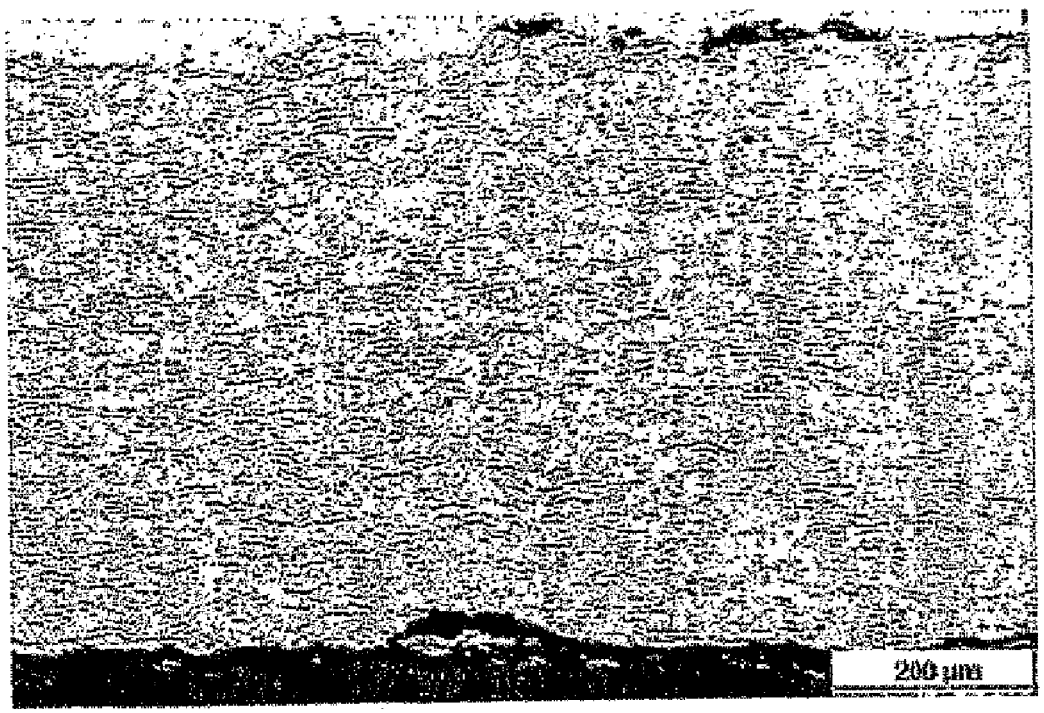
FIGS. 13A, 13B, and 13C are optical micrographs showing microstructures of coatings based on W-balance; Cr 4%; Co 10%; C 5.3% after 5 hours of oxidation at 750° C., wherein the coating on FIG. 13A includes 10% SHS, the coating of FIG. 13B includes 50% SHS, and the coating of FIG. 13C includes no SHS.
Figure 13B:
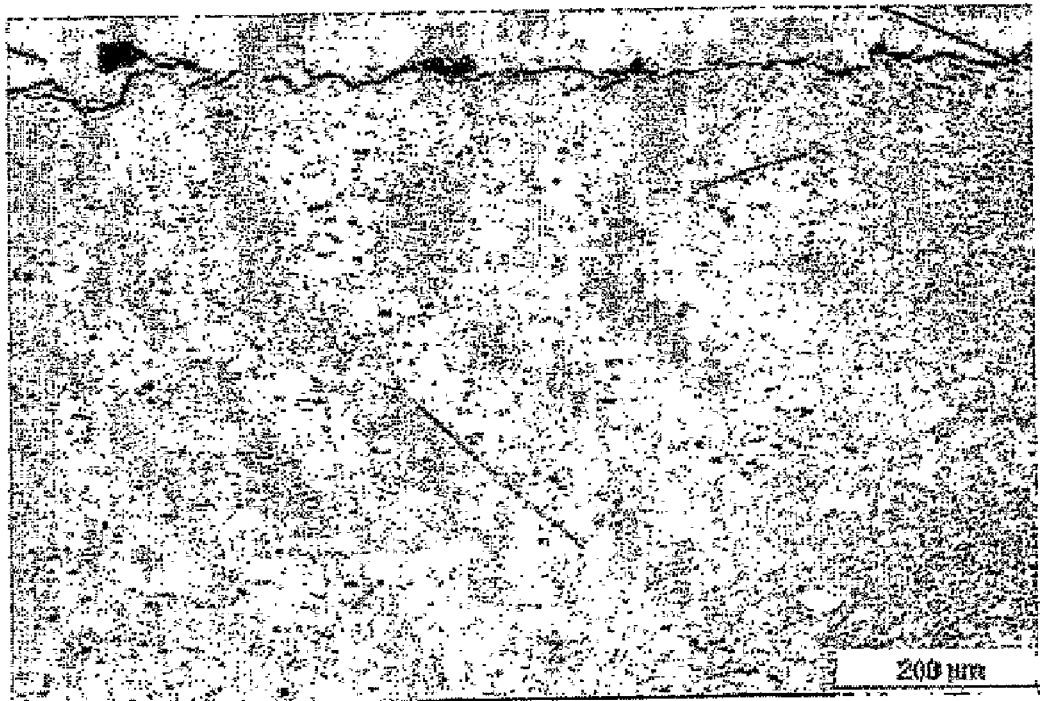
Figure 13C:
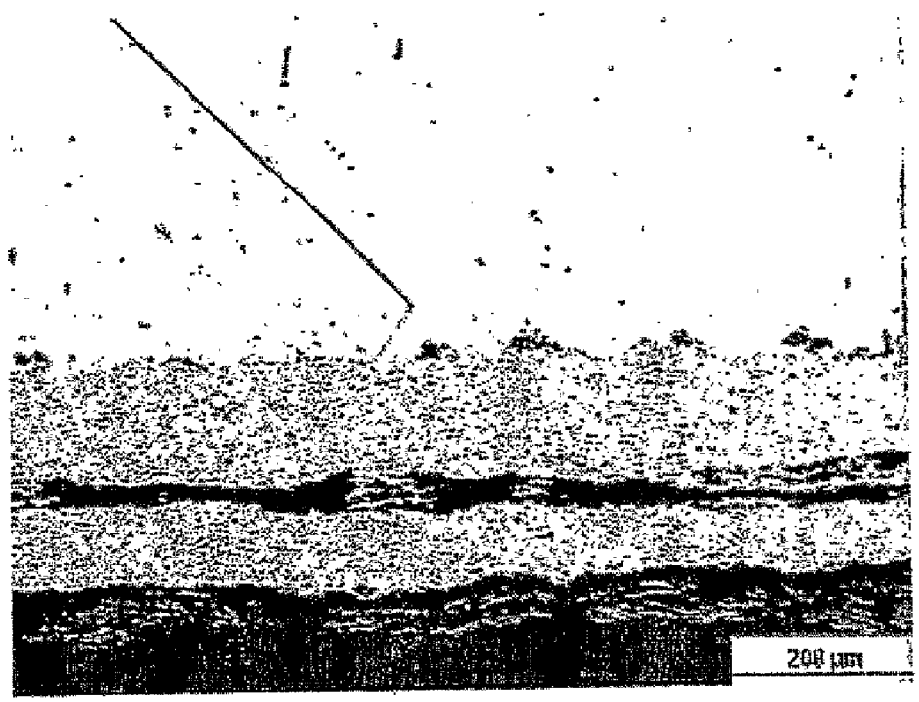
Figure 14A:
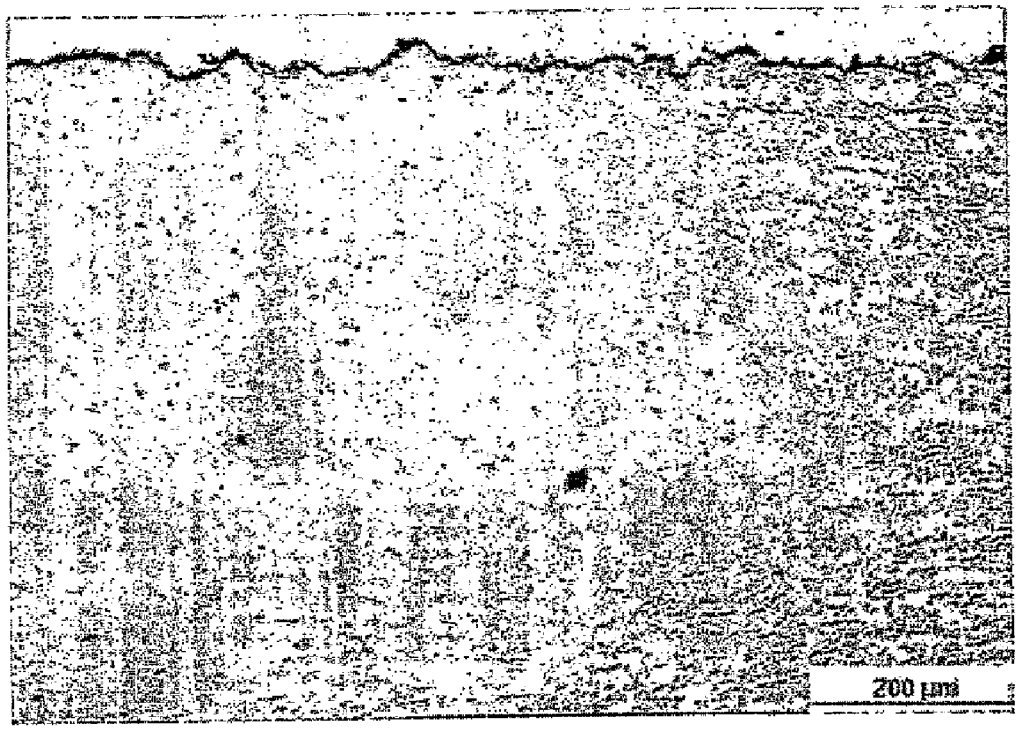
FIGS. 14A and 14B are optical micrographs showing microstructures of coatings based on W-balance; Cr 4%; Co 10%; C 5.3% after 5 hours of oxidation at 850° C., wherein the coating on FIG. 14A includes 50% SHS, and the coating of FIG. 14B includes no SHS.
Figure 14B:
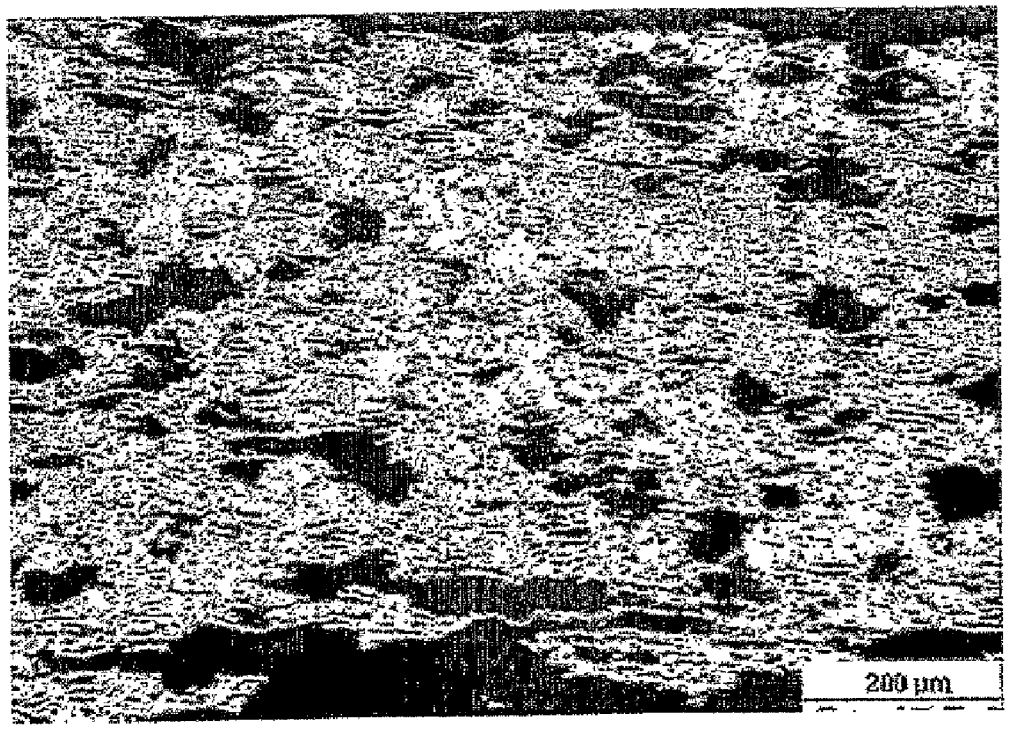

FIGS. 13A, 13B, and 13C illustrate the microstructure of the coatings after oxidation in air at 750° C. and FIGS. 14A and 14B illustrate the microstructure of the coatings after oxidation in air at 850° C. The addition of the amorphous alloy component significantly increased the oxidation resistance of the carbide-based coatings consisting of W-balance; Cr 4%; Co 10%; C 5.3%. This is evident when comparing FIGS. 13A and B with FIG. 13C exhibiting internal oxidation (dark oxidation region O) inside the deposited coating (shown in cross section in FIG. 13C).

FIG. 14A shows the microstructure of a good coating (including 50% SHS) after oxidation in air at 850° C., where there are no significant oxidation regions associated with the coating. FIG. 14B shows the microstructure of a coating) having no SHS (i.e. without amorphous alloy) after oxidation in air at 850° C., where the coating was completely oxidized and degraded. The oxidized coating having no SHS 7170 (FIG. 14A) is in direct contrast with the high quality coating having 50% of SHS 7170 (FIG. 14B) that is shown practically intact.

Additional composite coatings were deposited as follows: Composite powder was made by blending powders based on 1350VM powder manufactured by Praxair and SHS 7170 and SHS 7574 amorphous/nanocrystalline alloys manufactured by NanoSteel, Inc. SHS 7170 was used in the experiments once again to check the repeatability of coating performance. SHS 7170 and SHS 7574 powders were reclassified avoiding potential build up (barrel loading) of the JP 5000 barrel. Powder blend #18 was prepared using 35% of alloy SHS 7574 screened through a 500 mesh sieve and a 635 mesh sieve to attain particles of a size between 20 to 25 μm. This blend was tested with all other blends to determine the influence of the alloy particle size on a coating and its performance. Compositions of sprayed powders and related calculated densities are shown in Table 3.

The specimen was prepared as follows: All ¼" and ⅛" thick coupons went through 2 steps of surface preparation. The first step was a manual grit blasting by aluminum oxide (alumina) grit # 46/70 at a pressure of 80 psi and a distance of 4 inches. The second step was an additional grit blasting by alumina grit #24 at 80 psi of pressure and a distance of 4 inches. Two carbon steel 3"×1"×⅛" coupons for metallography and related studies and one carbon steel 3"×1"×¼" coupon for the G-65 abrasion resistance test were sprayed per set of parameters. SS410 specimens were used for the bond strength tests.

A high-velocity oxygen-fuel thermal spray system (HVOF) JP-5000 manufactured by Praxair-Tafa was used for the described experiments. The following spraying parameters optimized for 1350VM powder were kept constant during the experiments:

Oxygen flow rate: 2000 cubic feet per hour (scfh);
Kerosene flow rate: 5.8 gal/h;

The oxygen and kerosene flow rates provided approximately 100 psi combustion pressure and a 1.25 stoichiometry ratio.

The following spraying distance, motion-related and cooling conditions were also kept constant during the experiments:

Spraying distance: 14 inches;
Traverse horizontal speed: 24"/sec;
Vertical increment: 5 mm;
Cooling conditions: 4 air jets around the barrel were used for substrate cooling.
Jet size ID=¼";
Air pressure: approximately 80 psi.
Spraying surface temperature was measured by infrared thermometer during spraying and did not exceed 270° F.

The carrier gas flow rate was adjusted during experiments, keeping a symmetrical spray pattern. Powder feed rate was within 65-74 g/min and the total number of passes was adjusted for each type of powder providing a total coating thickness of approximately 27-34 thousands of an inch (34 mils). In this deposition, no attempt was made to optimize spraying parameters for the novel composite powders.

The sprayability data are summarized in Table 4. The sprayability study showed that NanoCermet materials can provide a 12-72% higher deposition rate per mil of a coating, resulting in a savings in powder costs of about 15-43% due to the 40-70% lower cost of the amorphous/nanocrystalline alloys in comparison with the cost of the 1350VM powder. Thus, cost of applications can be significantly decreased, thereby improving the economics of the existing WC-based coatings. This is presently particularly important due to the continuously increasing prices of W, Co, Cr and other materials.

Figure 16:
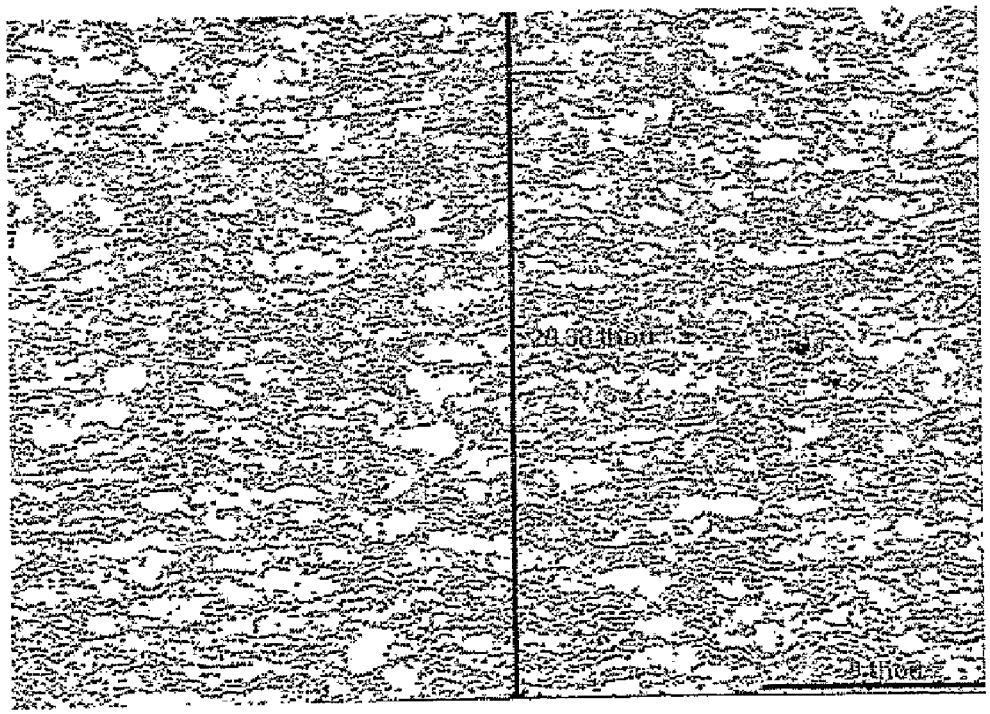
FIG. 16 is an optical micrograph showing microstructures of coatings made with a composite powder made of 50% 1350 VM and 50% SHS 7170 sprayed using separate powders fed using two injectors.
Figure 15A:
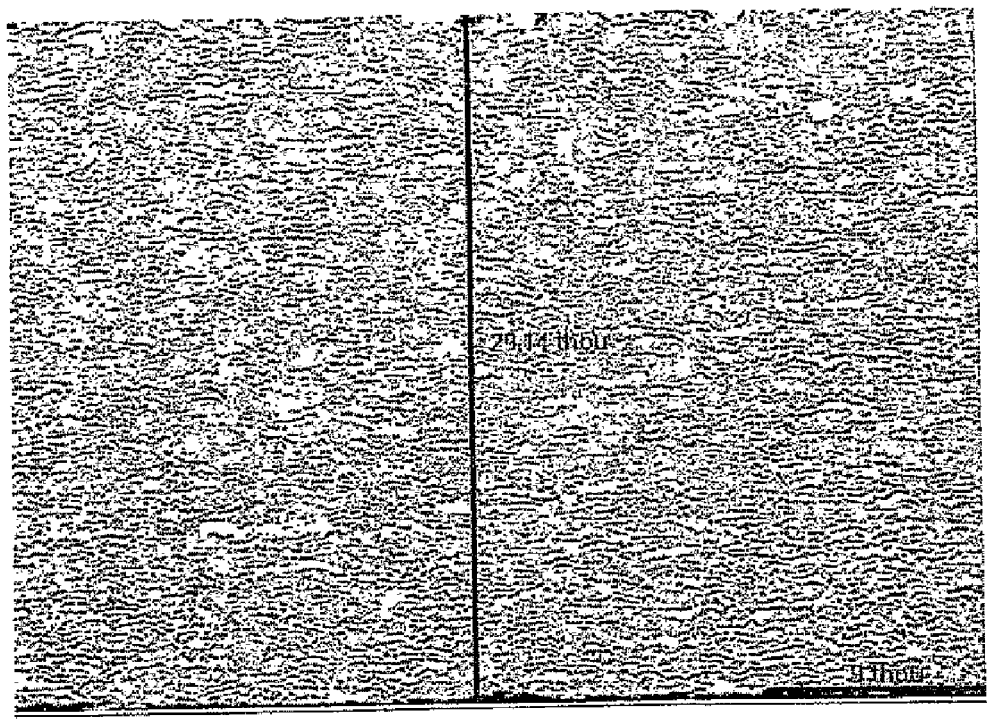
FIG. 15A is an optical micrograph showing microstructures of coatings made with a composite powder made of 65% 1350 VM and 35% SHS 7574 having particle size of 20-25 µm.
Figure 15B:
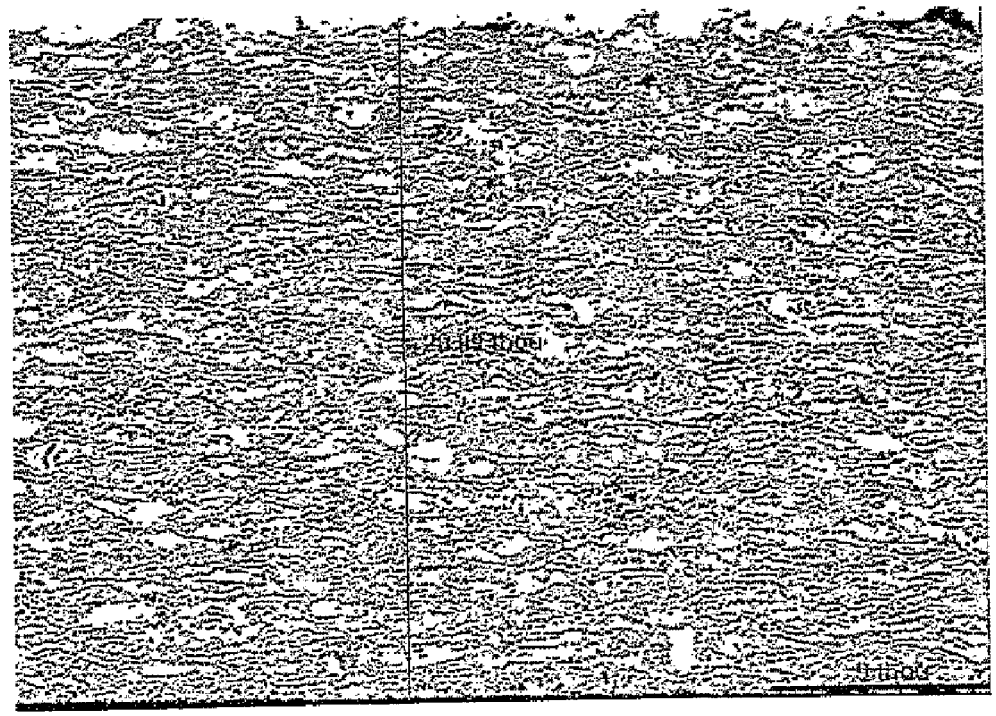
FIG. 15B is an optical micrograph showing microstructures of coatings made with a composite powder made of 65% 1350 VM and 35% SHS 7574 having particle size of 20-45 µm.
Figure 17A:
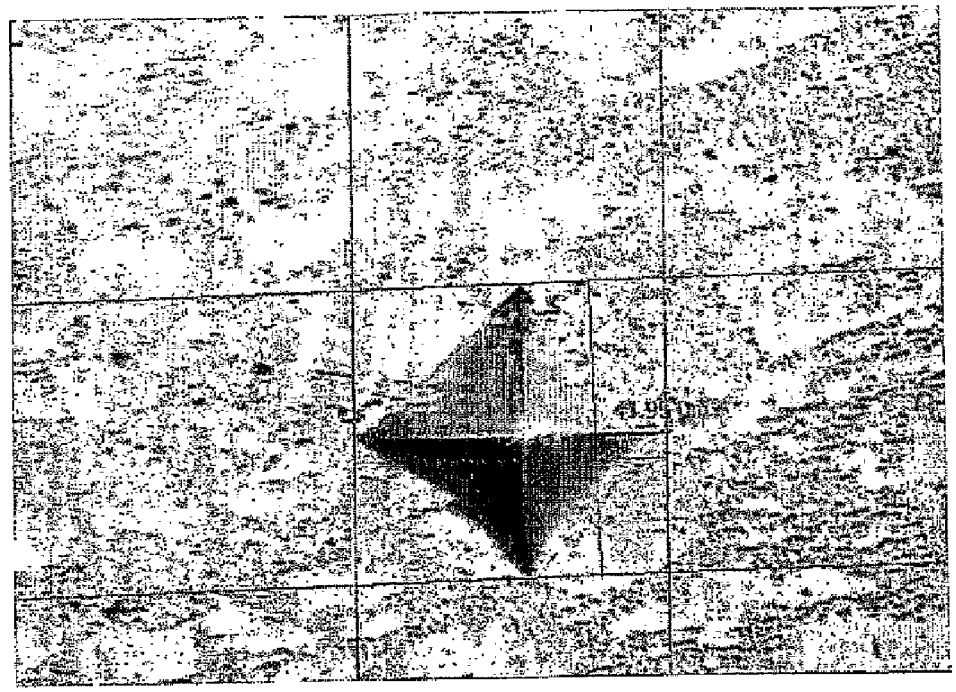
FIG. 17A is an optical micrograph showing an indentation into a sprayed coating made with a composite powder made of 65% 1350 VM and 35% SHS 7170.
Figure 17B:
FIG. 17B is an optical micrograph showing an indentation into a sprayed SHS 7170 coating.
Figure 18:
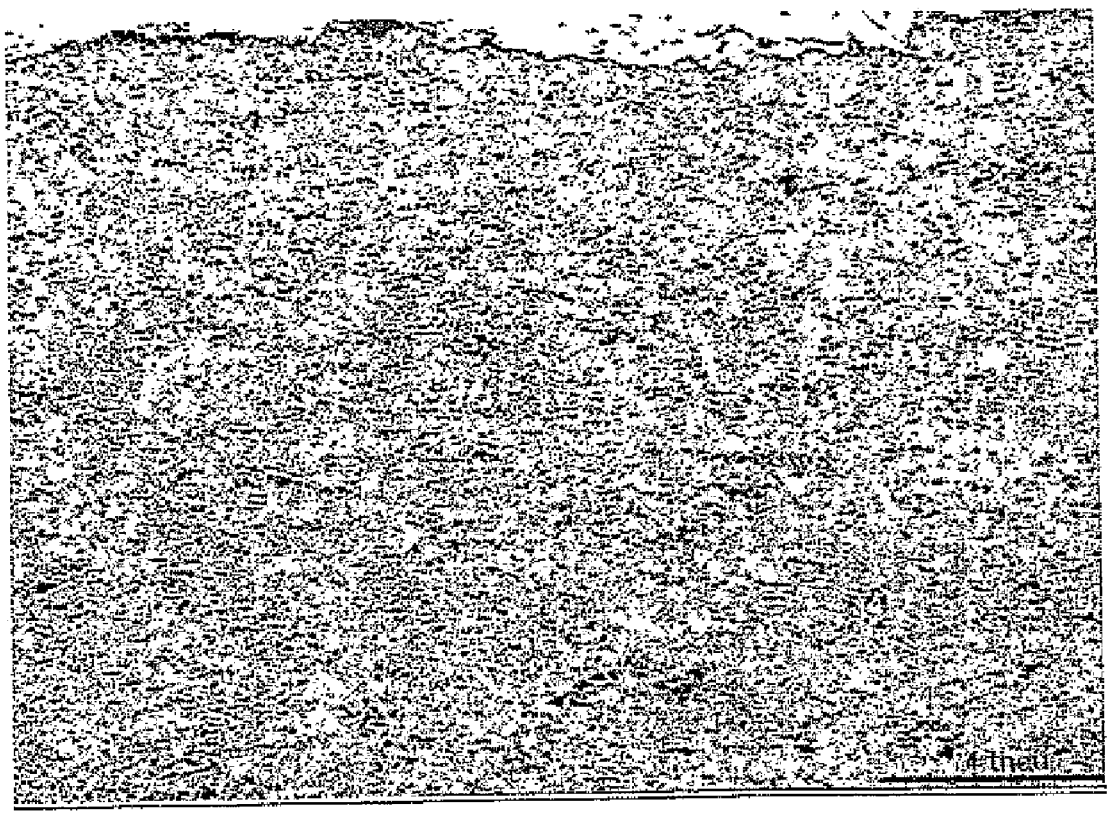
FIG. 18 is an optical micrograph showing microstructures of coatings made with a composite powder made of 80% WC and 20% SHS 7170.

Several composite coatings were deposited using the above-described technique. Furthermore, a control coating, made of only the 1350VM powder, was deposited for comparison. FIG. 15A shows microstructures of the coating made with the composite powder made of 65% of 1350VM and 35% of SHS 7574 having particle size of 20-25 µm. FIG. 15B shows microstructures of the coating made with the composite powder made of 65% 1350VM and 35% SHS 7574 having a particle size of 20-45 µm. FIG. 15B shows microstructures of the coating made with the composite powder made of 65% 1350VM and 35% SHS 7574 having a particle size of 20-45 µm. FIG. 16 shows microstructures of the coating made with the composite powder made of 50% 1350VM and 50% SHS 7170 sprayed using separate powders fed using two injectors. FIG. 18 shows microstructures of the coating made with the composite powder made of 80% WC and 20% SHS 7170. FIG. 17A shows the coating made with a composite powder made of 65% 1350 VM and 35% SHS 7170 after the microhardness measurement. FIG. 17B shows the coating made with only SHS 7170 after the microhardness measurement.

The tests of the deposited coatings are summarized in Table 5, where several conclusions can be drawn from the observations and data. The optical micrographs of a 1350VM coating show it being homogeneous without visible structural defects and cracks. The porosity is below 1%, with the oxide content below the limit of determination by the standard optical microscopy test. However, the 1350VM coating exhibits vertical and horizontal cracks. The presence of these cracks may be due to a 1350VM coating being near its performance limits at a thickness of 27 mils and thus not having enough toughness to withstand stresses.

On the other hand, all seven deposited composite coatings are homogeneous without visible structural defects and cracks. The porosity is below 1%, with the oxide content below the limit of determination by the standard optical microscopy test. In the optical micrographs, there were no micro defects detected between 1350VM and both amorphous/nanocrystalline alloys' splat boundaries, which mark the borders between the materials deposited by each droplet. This lack of defects importantly confirms that the amorphous alloys have good affinity for the nonmetallic constituents of the coatings.

The micro-hardness measurements were done by performing typical Vickers indentations into the composite coatings at a 300 gram load (as previously illustrated in FIG. 11), and at a 1,000 gram load as illustrated in FIGS. 17A and 17B. The coatings sprayed using only using amorphous/nanocrystalline alloys SHS 7170 and SHS 7574 do not have visible structural defects and cracks. However, these coatings exhibited excessive brittleness and some inter-particle defects after the Vickers indentations, as illustrated in FIG. 17B. Importantly, the novel composite coatings did not show any defects between metallic and carbide particles related to the Vickers indentations, which again confirms that the amorphous alloys have a good affinity for the nonmetallic constituents of the deposited coatings.

The best surface roughness was detected for coating 18, as shown in Table 5, which is explainable by the finer size of the completely melted particles of the alloy SHS 7574. This makes for very thin and evenly distributed lamellas of SHS 7574 and related dense packaging of the composite material in the coating.

The microhardness of the sprayed 1350VM reference coating was 1340 DPH300, which is higher by 90 kg/mm$^2$ than was obtained during the first set of experiments presented in Table 1. This difference is due to the correction/optimization of the spraying parameters, and thus illustrates the effect of optimization of the spraying parameters. As seen in Table 5, the microhardness of the coatings sprayed with 1350VM—nanocermet blends is less than that for pure 1350VM. The observed drops in DPH of the composite coatings were expected, and are related to the increased total content of the metallic constituents of the composite powders and coatings. The microhardness of nanocermet composite coatings can be improved by the optimization of spraying parameters. (As was mentioned above, the spray parameters in this experiment were solely optimized for 1350VM composition).

Referring still to Table 5, the superficial hardness 15N of 1350VM is about 91, while superficial hardness of nanocermet compositions is about 90-92 depending on the content of the alloy component. The bond strength of 1350VM coatings was about 12,300 psi, while all the composite coatings exhibited bond strengths above 13,500 psi. This is because of glue bond failure under such a big load. The higher bond strength for the composite coatings was expected, as described earlier, considering the unique bond strength of the amorphous coatings.

Table 6 also displays the results of the G-65 tests. The standard test method for measuring abrasion using the Dry Sand/Rubber Wheel Apparatus was done in accordance with the ASTM G-65 protocols. It is clear that the composite coatings containing 85% 1350VM by weight and 15% amorphous/nanocrystalline components by weight performed as well as the 100% 1350VM coating. These composite coatings can be further improved by optimizing the spraying processes and related parameters for the powder composition and the particle size.

Alloys SHS 7170 and 7574 have relatively low thermal conductivity, as mentioned above. The thermal conductivition can also be evaluated by examining the appearance of the back of the carbon steel coupons, which were ⅛" thick. The coupon sprayed solely with 1350VM exhibited a dark grey color caused by oxidation as a result of the relatively high temperature of the back of the coupon. The high temperature is due to the high thermal conductivity of the 1350VM coating. On the other hand, the back of the coupon sprayed with the amorphous/nanocrystalline alloy SHS 7170 exhibited no significant changes in color. This shows that the temperature of the coupon was lower due to the low thermal conductivity of the SHS 7170 alloy. The back of the coupon sprayed with the blend consisting of 50% 1350VM by weight and 50% SHS 7170 by weight shows very minor changes in color. This shows that the composite coatings made from 50% 1350VM and 50% SHS 7170 may have a relatively low thermal conductivity and may simultaneously perform wear, erosion and thermal barrier protection of the sprayed substrates. This is very useful in many applications where the coatings are deposited prior to use or on surfaces of refurbished parts.

Table 7 illustrates the results of the erosion tests in terms of weight loss and volume loss. The erosion tests were done using alumina grit no. 46-70 using a standard setup having a blasting nozzle located at a selected distance from the examined surface. The grit blasting nozzle accelerated the grit at an air blasting pressure of about 80 psi. The nozzle was located 90 degrees relative to the blasted surface of the coating sprayed on the ⅛" thick coupon. The distance between the nozzle exit and the blasted surface was 2 inches. Two hundred and twenty-five grams of grit were used to test each coating. The weight of the samples before and after grit blasting was measured to determine weight loss. Volume loss was calculated as weight loss divided by the coating density. The summary of the erosion data is in Table 7. The data shows that the novel composite coatings having 15% by weight of alloys SHS 7170 or SHS 7574, as well those having 35% by weight of SHS 7170 outperformed the benchmark coating 1350VM. Other composite coatings showed erosion resistance similar to the 1350VM coating. The erosion resistance of coatings made up of only SHS 7170 or SHS 7574 was determined to be approximately 1.4-2 times worse in comparison with erosion resistance of the novel composite coatings.

The compressive stress estimates were done using carbon steel samples having dimensions 3"×0.75"×0.031" (Almen standard stripes, type N). The samples were flattened after a grit blasting. The deflection of the samples was measured after spraying. A summary of the deflection tests is shown in Table 8. The results show that stress may be controlled by a ratio of nonmetallic components to the amorphous/nanocrystalline metallic component. For example, the 1350VM coating, as well as the novel composite coatings having 15 and 35% by weight of alloys SHS 7170 or SHS 7574, exhibited compressive stress. Increasing the content of the SHS alloy up to 50% resulted in practically neutral stress. It may be expected that further increasing of the content of an amorphous/nanocrystalline metallic component would result in tensile stress, as coatings sprayed by only SHS 7170 or SHS 7574 demonstrated tensile stress.

The stress of the composite coatings may also be controlled by the size of the amorphous/nanocrystalline metallic particles. FIG. 15A shows microstructures of the coating made with the composite powder (65% 1350VM and 35% SHS 7574) having a particle size of 20-25 µm. At the deposition point, these smaller particles were substantially melted and extended in the horizontal direction (i.e., in the spray direction and perpendicular to the spray increment). FIG. 15B shows microstructures of the coating made with the composite powder (65% 1350VM and 35% SHS 7574) having a particle size of 20-45 µm. At the deposition point, the larger particles were not melted. Thus, the changes in the size of the amorphous/nanocrystalline alloy SHS 7574 from about 20-45 µm to about 20-25 µm resulted in changes in stress from compressive to neutral in the sprayed coatings. Having all SHS 7574 particles melted may explain the difference in performance. The coating shown in FIG. 15A is expected to exhibit great anticorrosion properties, but somewhat smaller wear resistance compared to the coating shown in FIG. 15B, which is expected to exhibit a high wear resistance.

There are additional examples of the composite powder designed for deposition of coatings having desired properties.

Example 2

To make the composite powder designated CP-2, commercially available powders 1350VM from Praxair Surface Technologies and SHS 7170 powder manufactured by Nanosteel, Inc. are used.

Composite powder CP-2 is made as follows: the thermal spray powder having a nominal composition of 86% by weight tungsten carbide (WC), 10% by weight Cobalt (Co) and 4% by weight Chromium (Cr), or 1350VM powder, is screened through a 325 mesh sieve to insure the absence of coarse particles larger than 45-50 µm. Similarly, the amorphous metallic alloy powder, grade SHS 7170, manufactured by Nanosteel, Inc. is also screened through a 325 mesh sieve for the same purpose. SHS 7170 is composed of 25% or less Chromium, 8% or less Molybdenum, 10% or less Tungsten, 2% or less Carbon, 5% or less Manganese, 2% or less Silicon, 5% or less Boron, and a balance of Iron. Additionally, these powders are screened through a 635 mesh sieve to remove fine particles having a size of less than 15 µm. After screening, 8.50 lbs of 1350VM powder and 1.50 lbs of SHS 7170 powder are loaded in a V-type blender having a capacity of about 1 cubic foot, and are blended for 30 min at 30 rpm.

Example 3-7

Composite powders having various amounts of each component, designated as Composites No. 3 through No. 7 are prepared as described in the protocol for composite powder CP-2, above. However, powder SHS 7170 may be replaced with component SHS 7574 (also manufactured by Nanosteel, Inc.), and different quantities of each component are used for each of the different composite powders. Metallic alloy powder SHS 7574 has a composition similar to SHS 7170, but includes a higher content of Molybdenum.

| Composite Powder | Components 1350Vm (lbs.) | Quantity loaded in SHS 7170 (lbs.) | V-blender SHS 7574 (lbs.) |
|---|---|---|---|
| CP-2 | 8.50 | 15.0 | 0.00 |
| CP-3 | 8.50 | 0.00 | 1.50 |
| CP-4 | 6.50 | 0.00 | 3.50 |
| CP-5 | 6.50 | 3.50 | 0.00 |
| CP-6 | 5.00 | 5.00 | 0.00 |
| CP-7 | 5.00 | 0.00 | 5.00 |

Example 8

To make the composite powder designated CP-8, commercially available powders 1350VM from Praxair Surface Technologies and SHS 7574 powder manufactured by Nanosteel, Inc. are used.

CP-8 is made as follows: Powder 1350VM is screened through a 325 mesh sieve to insure the absence of coarse particles larger than 45-50 µm. Metallic alloy powder SHS 7574 is then screened through a 500 mesh sieve and the resulting powder which passed the 500 mesh sieve is additionally screened through a 635 mesh sieve to obtain particles having a size of about 30 to 20 µm. After screening, 8.50 lbs of 1350VM powder and 1.50 lbs of SHS 7574 powder are loaded in a V-type blender having a capacity of about 1 cubic foot, and are blended for 30 min at 30 rpm.

Example 9

Commercially available powder of the amorphous alloy, grade SHS 7170, (Nanosteel, Inc.) is screened through a 500 mesh sieve to obtain a fine powder having a particle size of less than 30 µm. This fine SHS 7170 powder is then comminuted by jet milling with a Hosokawa Micron Ltd. jet mill to provide a feedstock powder of the amorphous alloy with a mean particle size of about 2.5 µm as measured by Microtrac, and a Fisher Subsieve Size number (FSSS) of about 1.5 as measured by the Fisher Subsieve Sizer. The high oxidation resistance of the alloy is tested by analyzing the jet-milled powder's oxygen content. No significant increase in oxygen content should be found.

Twenty pounds of WC powder having an FSSS number of 1.6 (manufactured by Buffalo Tungsten, Inc.), 5.0 lbs of jet-milled SHS 7170 powder, 1.2 gal of water, 0.075 lbs of Darvan-C dispersant and 0.125 lbs of Optapix polyvinylacetate binder are loaded into vibratory mill model DM-1 (Sweco) containing 100 lbs of ¼" size grinding balls made of WC-6Co cermet. The dispersant and the binder correspond to 0.3% by weight and 0.5% by weight of the total solids, respectively. The components are vibro-milled for 4 hrs, and the resultant slurry is transferred to a tank equipped with an impeller stirrer. Particle size of the slurry is tested by Microtrac. All particles must have a particle size of less than 11 μm, and 85% of these must have a particle size of less than 5.5 μm.

The prepared slurry is then spray-dried using a Niro pilot rotary atomizer at a feed rate of 0.04 gal/min, an outlet temperature of 110° C., and 5000 rpm of the atomizer head. A collected 22 lbs of spray-dried powder is screened through a 230 mesh sieve to remove excessively coarse particles. It is then screened through a 500 mesh sieve to remove excessively fine particles and dust. A resulting 12 lbs of the cleaned spray-dried powder is placed into graphite boats as 1" thick flat layers. The boats are covered with graphite lids, loaded into a Centorr vacuum furnace and sintered for 2 hrs at 1200+/−20° C. while surrounded by Ar gas at a pressure of 600 mTorr. The porous briquettes of sintered powder are deagglomerated by screening through an 80 mesh sieve first and then screening through 170 and 270 mesh sieves. Finally, the resulting powder is blended in a V-type blender for 2 hrs at 30 rpm.

The deagglomerated powder is screened through a 325 mesh sieve and then through a 635 mesh sieve. The protocol yields 9.5 lbs of the novel composite powder having about 15% by weight of the amorphous metallic binder. The morphology of the powder particles is typical for the spray-drying and sintering process. The particles are spheroidal low porous particles with distinguishable grains of tungsten carbide which are covered/conjoined with a layer/film of metallic component.

Example 10 provides a protocol illustrating the preparation of spray-dried but not sintered powders of the novel composite.

First, the amorphous alloy powder, SHS 7170 (Nanosteel, Inc.) is screened through a 500 mesh sieve to obtain fine alloy powder having a particle size of less than 30 μm. This fine SHS 7170 powder is then comminuted by a jet milling technique with a Hosokawa jet mill to provide a feed stock powder of the amorphous alloy with a mean particle size of about 2.5 μm as measured by Microtrac and an FSSS of about 1.5, as measured by the Fisher Subsieve Sizer. The high oxidation resistance of the alloy is tested by analyzing the jet-milled powder's oxygen content. No significant increase in oxygen content should be found.

Twenty pounds of WC powder having an FSSS number of 1.6 (manufactured by Buffalo Tungsten, Inc.), 5.0 lbs of the jet-milled SHS 7170 powder, 1.2 gal of water, 0.075 lbs of Darvan-C dispersant and 0.50 lbs of Optapix polyvinylacetate binder are loaded into vibratory mill model DM-1 (Sweco) containing 100 lbs of ¼" size grinding balls made of WC-6C0 cermet (commercially available) for milling. The dispersant and the binder correspond to 0.3% by weight and 2.0% by weight of the total solids, respectively. The components are vibro-milled for 4 hrs, and the resultant slurry is transferred to a tank equipped with an impeller stirrer. The particle size of the slurry is tested by Microtrac. All particles must have a particle size of less than 11 μm, and 85% of these must have a particle size of less than 5.5 μm.

The prepared slurry is then spray-dried using a Niro pilot rotary atomizer at a feed rate of 0.04 gal/min, an outlet temperature of 110° C., and 5000 rpm of the atomizer head. Because a spray-dried powder contains both very coarse and very small particles, these should be removed. When this is done, the yield decreases and the fraction of the resulting spray-dried powder, after going through the 325-500 mesh, is approximately 11 lbs. This powder is further screened through a 325 mesh sieve to remove excessively coarse particles. It is then screened through a 500 mesh sieve to remove excessively fine particles and dust.

A resulting 11 lbs of the cleaned spray-dried powder is placed into stainless steel boats as ½" thick flat layers. The boats are heated in an oven for 2 hrs at 150+/−5° C. to make the organic binder insoluble in water. The morphology of the resulting powder's particles is typical for the spray-drying process. The resulting powder includes spheroidal porous particles with distinguishable grains of tungsten carbide conjoined with finely dispersed metallic particles Example 11 provides a protocol illustrating the preparation of sintered and crushed powders of the novel composite. First, the amorphous alloy powder, SHS 7170 (Nanosteel, Inc.) is screened through a 500 mesh sieve to obtain fine powder of the alloy having a particle size of less than 30 μm. This fine SHS 7170 powder is then comminuted by a jet milling technique with a Hosokawa jet mill to provide a feed stock powder of the amorphous alloy with a mean particle size of about 2.5 μm as measured by Microtrac and an FSSS of about 1.5, as measured by the Fisher Subsieve Sizer. The high oxidation resistance of the alloy is tested by analyzing the jet-milled powder's oxygen content. No significant increase in oxygen content should be found.

Sixteen pounds of WC powder having an FSSS number of 1.6 (manufactured by Buffalo Tungsten, Inc.) and 4.0 lbs of jet-milled SHS 7170 powder are loaded into a V-type blender having a capacity of about 1 cubic foot and blended for 2 hrs at 20 rpm. The blend of components is placed into a graphite boat and hand compacted by tapping the powder with 4"×4"× 8" stainless steel plates. The boat is covered with a graphite lid, loaded into a Centorr vacuum furnace and sintered for 1 hr at 1250+/−20° C. while surrounded by Ar gas at a pressure of 600 mTorr.

The solid briquette of sintered powder is crushed into fragments of less than about ⅛" in size with a jaw-crusher, and then crushed further with a roll-crusher. The crushed powder is passed through an impact mill, thus reducing the size of the particles down to 65 μm or less. This powder is screened through a 325 mesh sieve and any oversized powder particles are passed through the impact mill once more for a total of 3 to 5 passes through the impact mill. The yield is about 18.5 lbs of powder.

The resulting powder is screened through a 325 mesh sieve and then through a 635 mesh sieve. The yield after this step is 16.1 lbs of the novel composite powder having about 15% by weight of the amorphous metallic binder. The morphology of the particles of the powder is typical for the sintering and crushing process. These are shapeless particles, looking like pieces of broken glass, having no distinguishable substructure.

The surfaces of the substrates are usually cleaned by grit blasting and degassing. Initially, degreasing is needed to remove any oil, grease or other organic residues from the surface. Acetone is used to clean the surface of the coupons as the first step of surface preparation. Hot vapor degreasing, ultrasonic cleaning and other methods may be used as well if a surface has significant contamination. Grit blasting is used to clean the surface to remove possible oxide scales, oxide films, etc., as well as to activate the surface. Grit blasting creates a predetermined surface roughness depending mainly on grit size, blasting pressure, blasting angle and distance from the surface. The surface roughness of 25-50 micrometers is commonly recommended as a starting point for the process of High Velocity Oxygen Fuel thermal spraying (HVOF) and some other coating deposition methods. This surface roughness for HVOF depositions on thin coupons used for deflection/stresses estimates is achieved by grit blasting using alumina grit # 46-70 at a pressure of 80 psi and a distance of 4" from the coupon surface.

The surface roughness of approximately 60-125 µm is required for plasma depositions as well as for some HVOF heavy-duty applications. Surface roughness of about 70-80 µm is achieved on 3"×1"×⅛" and 3"×1×¼" coupons by grit blasting using alumina grit # 24 at a pressure of 80 psi and a distance of 4" from the coupon surface.

The deposition system and parameters are optimized depending on the composition of the above-described composite powder, and the particle size. The liquid fuel-based HVOF systems enable efficient, inexpensive deposition the novel composite coating. The JP-5000 thermal spray system (manufactured by Praxair Tafa, Inc.) may be used to spray coatings. When using JP-500, each blend is loaded into a powder feeder connected through a powder hose and a splitter with 2 powder injectors located on a barrel. The following spraying JP-5000 parameters used for the deposition of powder blends:
  Oxygen flow rate: 2000 scfh;
  Kerosene flow rate: 5.8 gal/h;
  Powder feed rate: approximately 70 grams/min.

The oxygen and kerosene flow rates stated above provide a pressure of approximately 100 psi combustion and a stoichiometry ratio of approximately 1.25.

The JP-5000 thermal spray system may use the following spraying and motion parameters for depositions of the composite coatings:
  Spraying distance: 14 inches; —Traverse horizontal speed: 247 sec;
  Vertical increment: 5 mm;
  Substrate cooling is done with 4 air jets around the barrel. (Jets ID=¼");
  Air pressure: approximately 80 psi.

The conditions stated above provide a spraying surface temperature below 270° F. and a coating deposition rate of approximately 25-40 µm per pass over coupon. The temperature of the spraying surfaces is measured with an infrared thermometer during spraying and should not exceed 270° F.

According to another example, the JP-5000 thermal spray system may be used to spray novel composite coatings using 2 powder feeders so that the nonmetallic components and amorphous/nanocrystalline metallic components are fed into the system separately. The powder feeder is loaded with 1350VM powder, is calibrated at approximately 35 grams/min feed rate and connected with the first powder injector. The second powder feeder is loaded with amorphous/nanocrystalline alloy SHS 7170 powder, is calibrated at approximately 35 grams/min feed rate and connected with the second powder injector. A composition consisting of 50% 1350VM by weight and 50% SHS 7170 by weight may be sprayed using this approach. (FIG. 16 illustrates a composition consisting of 50% 1350VM by weight and 50% SHS 7170 by weight.) When each powder feeder is calibrated for the rate of 35 grams/min, then approximately 50-50 deposition is sprayed.

According to another example, the composite coating is formed from an unmelted nonmetallic component and an amorphous/nanocrystalline metallic component under different conditions. The above provided parameters for the JP-5000 thermal spray system (i.e., oxygen flow rate of 2000 scfh; kerosene flow rate of 5.8 gal/h and powder feed rate of approximately 70 grams/min) heat the 20-53 µm particles of tungsten carbide below about 2000° C., which is significantly less than tungsten carbide's melting point of about 2700° C. Under the same conditions, the SHS 7574 particles would be heated up to a temperature of approximately 1400-1800° C. if their size is about 20-25 µm. This is significantly above the melting points of SHS alloys, which are about 1100-1300° C. Under these conditions, the SHS 7574 particles of approximately 35-45 µm would be heated up to 900-1100° C. Therefore, these relatively big particles are largely unmelted.

Two blends consisting of 35% SHS 7574 by weight and 65% 1350VM by weight are used for coatings, with a first having a particle size of 20-25 µm (using −500+635 mesh sieve) and a second having a particle size of 20-45 µm (−325+635 mesh size). The micrograph of the cross section of the deposit made up of the first blend (FIG. 15A) demonstrates that all SHS 7574 particles were melted and formed fine thin lamellas in the deposition. The micrograph of the cross section of the deposit made up of the second blend (FIG. 15B) demonstrates that some of the SHS 7574 particles were melted (the fine particles) and formed fine thin lamellas in the deposition. The image also shows that another portion of the SHS 7574 particles were not melted (the larger particles), and formed relatively rounded particles or thick lamellas within the coating. No cracks or similar defects were observed in the unmelted SHS 7574 particles, which may be considered proof that their temperature was above the temperature of brittle-ductile transition.

According to another embodiment, the composite coatings may also be sprayed with a Jet Kote HVOF system manufactured by Deloro Stellite Coatings, Inc. The composite coatings may be sprayed using the Jet Kote system at a hydrogen flow rate of approximately 1100-1400 scfh and an oxygen flow rate of approximately 450-600 scfh. Fuel rich combustion mixtures are recommended as a rule by Stellite so that the combustion mixture is less likely to oxidize particles.

According to another embodiment, the composite coatings may also be sprayed with the Diamond Jet DJ 2600 HVOF system manufactured by Sulzer Metco Ltd. The composite coatings can be sprayed using the DJ 2600 system at flow rates similar to those described for the Jet Kote system (a hydrogen flow rate of approximately 1100-1400 scfh and an oxygen flow rate of approximately 450-600 scfh). Diamond Jet also needs an additional 700-1000 scfh of cold air or nitrogen which is fed into the convergent part of the nozzle for cooling.

According to another embodiment, the following examples are given to illustrate the process of heat treatment of the novel composite coatings. The composite coatings containing 15% SHS 7170 by weight and 85% 1350VM by weight were sprayed on 3×1×½" steel coupons using the following spraying JP-5000 parameters:
  Oxygen flow rate: 2000 scfh;
  Kerosene flow rate: 5.8 gal/h;
  Powder feed rate: approximately 70 grams/min.
  Spraying distance: 14 inches; —Traverse horizontal speed: 247 sec;
  Vertical increment: 5 mm;
  Substrate cooling is done with 4 air jets around the barrel. (Jet ID=W);
  Air pressure: approximately 80 psi.

Then, the substrates with the resulting composite coatings are loaded into a vacuum furnace and gradually heated up to 700 (+/−5)° C., increasing the temperature at a rate of 4.5° C./min, while surrounded by Ar gas at a back pressure of 600 mTorr. At 700° C. the samples are incubated for 30 min. The furnace is then turned off and allowed to cool down to room temperature. The temperature of the heat treatment is about 60° C. above the devitrification temperature of SHS 7170.

According to yet another embodiment, the composite coatings containing 15% SHS 7574 by weight and 85% 1350VM by weight are sprayed on 3×1×½" steel coupons using the parameters described above. The substrates with the resulting composite coatings are loaded into a vacuum furnace and heated up to 750 (+/−5)° C., increasing the temperature at a rate of 4.5° C./min, while surrounded by Ar gas at a back pressure of 600 mTorr. At 750° C. the samples are incubated for about 30 min. The furnace is then turned off and allowed to cool down to room temperature. The temperature of the heat treatment is about 50° C. above the devitrification temperature of SHS 7574.

Additional embodiments are combinations of the above-described composite powders (their compositions and particle sizes), and deposition parameters including the oxygen flow rate, the fuel flow rate, the powder feed rate, the spraying distance, the traverse horizontal speed, the vertical increment, the substrate cooling and other parameters.

The invention claimed is:

1. A composite powder for a deposition of composite coatings comprising: at least two components including
   a nonmetallic component, present in the range of about 40-84% by weight, wherein said nonmetallic component is selected from the group consisting of carbides, borides, nitrides, carbonitrides, oxides, oxycarbonitrides or a combination thereof and has a size of more than 0.2 microns; and
   an amorphous component comprising an alloy containing at least one of Fe, Co, or Ni, and wherein said amorphous component has less than about 50% crystallinity and a size of less than 100 microns; and
   wherein said components are mixed together to provide said composite powder having a particle size in the range of about 15-160 microns.

2. The composite powder of claim 1, wherein said amorphous component further comprises a transition metal selected from the group consisting of Mo, Cr, W or combinations thereof, present at about 43% by weight or less.

3. The composite powder of claim 1, wherein the amorphous component further comprises an element selected from the group consisting of C, Si, B, Mn or combinations thereof, present at about 14% by weight or less.

4. The composite powder of claim 1, wherein at least one of said components comprises agglomerates.

5. The composite powder of claim 1, further comprising agglomerates of said components, wherein component size is less than 10 microns.

6. The composite powder of claim 5, wherein said amorphous component has a mean size of about 2.5 μm.

7. The composite powder of claim 1, wherein said components have a size of more than 15 microns.

8. The composite powder of claim 7, wherein said nonmetallic component has a size of less than 50 microns.

9. The composite powder of claim 1, further comprising a third metallic component.

10. The composite powder of claim 9, wherein said third metallic component comprises a crystalline metal comprising Co, Ni, Cr or combinations thereof.

11. The composite powder of claim 9, wherein said third metallic component is less than about 50% by volume of the total metallic phase.

12. The composite powder of claim 9, wherein said nonmetallic component is mixed with said third metallic component.

13. The composite powder of claim 9, wherein said nonmetallic component has an average size of 0.2 to 10 microns.

* * * * *